US008649195B2

(12) United States Patent
Mao et al.

(10) Patent No.: US 8,649,195 B2
(45) Date of Patent: Feb. 11, 2014

(54) HYBRID SPACE VECTOR PWM SCHEMES FOR INTERLEAVED THREE-PHASE CONVERTERS

(75) Inventors: Xiaolin Mao, Tempe, AZ (US); Rajapandian Ayyanar, Gilbert, AZ (US); Amit Kumar Jain, Portland, OR (US)

(73) Assignees: Arizona Board of Regents for and on Behalf of Arizona State University, Scottsdale, AZ (US); Peregrine Power LLC, Wilsonville, OR (US)

( * ) Notice: Subject to any disclaimer, the term of this patent is extended or adjusted under 35 U.S.C. 154(b) by 251 days.

(21) Appl. No.: 13/081,557

(22) Filed: Apr. 7, 2011

(65) Prior Publication Data

US 2012/0147639 A1    Jun. 14, 2012

Related U.S. Application Data

(60) Provisional application No. 61/322,139, filed on Apr. 8, 2010.

(51) Int. Cl.
*H02J 1/10* (2006.01)

(52) U.S. Cl.
USPC .......................................................... 363/71

(58) Field of Classification Search
USPC .............................. 363/39, 65, 51, 50, 71, 98
See application file for complete search history.

(56) References Cited

U.S. PATENT DOCUMENTS

| 7,324,360 | B2 * | 1/2008  | Ritter et al. ..................... 363/71 |
| 7,400,518 | B2 * | 7/2008  | Yin et al. ........................ 363/41 |
| 7,492,616 | B2 * | 2/2009  | Fu et al. .......................... 363/40 |
| 7,593,243 | B2 * | 9/2009  | Ganev et al. .................... 363/44 |
| 7,738,267 | B1 * | 6/2010  | Tallam et al. ................... 363/35 |
| 7,852,643 | B2 * | 12/2010 | Zhang et al. .................... 363/65 |
| 7,939,959 | B2 * | 5/2011  | Wagoner et al. ................ 290/55 |
| 7,944,161 | B2 * | 5/2011  | Hiti et al. ................. 318/400.02 |
| 8,009,443 | B2 * | 8/2011  | Krause ............................ 363/17 |
| 8,138,620 | B2 * | 3/2012  | Wagoner et al. ................ 290/44 |
| 8,169,179 | B2 * | 5/2012  | Mohan et al. ................. 318/800 |
| 2011/0122661 | A1 * | 5/2011 | Sakakibara ..................... 363/37 |

OTHER PUBLICATIONS

Wang Li-qiao et al., "Carrier phase shifted SPWM based on current sourced multi-modular converter for active power filter", Journal of Zhejiang University Science, 2004 5(7): pp. 861-866.*

(Continued)

*Primary Examiner* — Gary L Laxton
*Assistant Examiner* — Kyle J Moody
(74) *Attorney, Agent, or Firm* — Withrow & Terranova, P.L.L.C.

(57) ABSTRACT

Systems and methods for controlling a modular three-phase converter including two or more interleaved, parallel connected Voltage Source Converters (VSCs) utilizing a hybrid Space Vector Pulse Width Modulation (SVM) control scheme are provided. For the hybrid SVM control scheme, six active vectors utilized for SVM define six sectors in a space vector plane. Each sector is divided into two or more regions having corresponding optimal SVM switching sequences. In operation, a revolving reference voltage vector is sampled to provide a reference voltage vector. The SVM controller then identifies one of the regions in one of the sectors that corresponds to an angle and, in some embodiments, a magnitude of the revolving reference voltage vector and applies the corresponding optimal SVM switching sequence to the two or more interleaved, parallel connected VSCs.

16 Claims, 28 Drawing Sheets

(56) References Cited

OTHER PUBLICATIONS

Narayanan et al., "Space Vector Based Hybrid PWM Techniques for Reduced Current Ripple", IEEE Transactions on Industrial Electronics, vol. 55, No. 4, Apr. 2008, pp. 1614-1627.*

Asimmoaei, L. et al., "An Interleaved Active Power Filter with Reduced Size of Passive Components," Proceedings of IEEE—APEC '06, Mar. 19-23, 2006, pp. 969-976.

Ayyanar, R. et al., "Active Input-Voltage and Load-Current Sharing in Input-Series and Output-Parallel Connected Modular DC-DC Converters using Dynamic Input-Voltage Reference Scheme," IEEE Transactions on Power Electronics, vol. 19 No. 6, Nov. 2004, pp. 1462-1473.

Bhavsar, T. et al., "Harmonic Analysis of Advanced Bus-Clamping PWM Techniques," IEEE Transactions on Power Electronics, vol. 24 No. 10, Oct. 2009, pp. 2347-2352.

Casadei, D. et al., "Theoretical and Experimental Analysis for the RMS Current Ripple Minimization in Induction Motor Devices Controlled by SVM Technique," IEEE Trans. Ind. Electron., vol. 51 No. 5, 2004, pp. 1056-1065.

Choi, J. et al., "Improved Digital Control Scheme of Three Phase UPS Inverter Using Double Control Strategy," Proceedings of IEEE—APEC '97, vol. 2, Feb. 23-37, 1997, pp. 820-824.

Dai, K. et al., "Novel Control Techniques for Three-Phase Three-Wire Series-Parallel Compensated Line-Interactive UPS System," Proceedings of IEEE—IECON '03, vol. 1, Nov. 2-6, 2003, pp. 770-775.

Dejia, Z. et al., "Design and Control of a Three-Phase Grid-Connected Photovoltaic System with Developed Maximum Power Point Tracking," Proc. IEEE—APEC 2008, Austin, TX, Feb. 24-28, 2008, pp. 973-979.

Ericsen, T. et al., "PEBB—Power Electronics Building Blocks From Concept to Reality," Proceedings of PEMD 2006, Apr. 4-6, 2006, pp. 12-16.

Giri, R. et al., "Common-Duty-Ratio Control of Input-series Connected Modular DC-DC Converters with Active Input Voltage and Load-Current Sharing," IEEE Transactions on Industry Applications, vol. 24 No. 4, Jul.-Aug. 2006, pp. 1101-1111.

Krishnamurthy, H. et al., "Stability Analysis of Cascaded Converters for Bidirectional Power Flow Applications," Proc. IEEE Intelec 2008, Sep. 14-18, 2008, pp. 1-8.

Hava, A.M. et al., "Simple Analytical and Graphical Methods for Carrier-Based PWM-VSI Drives," IEEE Trans. Power Electron, vol. 14, No. 1, Jan. 1999, pp. 49-51.

Holmes, D. G., et al., Pulse Width Modulation for Power Converters: Principles and Practice. Hoboken, NJ: Wiley, 2003, pp. 24-35.

Holtz, J., "Pulse width Modulation—A Survey," IEEE Trans. Ind. Electron, vol. 39, No. 5, Dec. 1992, pp. 410-420.

Hudson, R.M. et al., "Design Considerations for Three-Phase Grid Connected Photovoltaic Inverters," Proceedings of Photovoltaic Specialists Conference, May 19-24, 2002, pp. 1396-1401.

Iqbal, A. et al., "Comprehensive Relationship Between Carrier-Based PWM and Space Vector PWM in a Five-Phase VSI," IEEE Transaction on Power Electronics, vol. 24 No. 10, Oct. 2009, pp. 2379-2390.

Jeong, S. et al., "The Analysis and Compensation of Dead-Time Effects in PWM Inverters," IEEE Transactions on Industrial Electronics, vol. 38 No. 2, Apr. 1991, pp. 108-114.

Krishnamurthy, H. et al., "Design of Space Vector-Based Hybrid PWM Techniques for Reduced Current Ripple," in Proc. IEEE—APEC, Miami, FL, Feb. 2003, pp. 583-588.

Lopez, O. et al., "Multilevel Multiphase Space Vector PWM Algorithm with Switching State Redundancy," IEEE Transactions on Industrial Electronics, vol. 56 No. 3, Mar. 2009, pp. 792-804.

Mao, X. et al., "Dead Time Effect in Two-Level Space Vector PWM Voltage Source Inverters with Large Current Ripple," Applied Power Electronics Conference and Exposition (APEC), 2011 Twenty-Sixth Annual IEEE, Mar. 2011, 6 pages.

Mazumder, S.K., "Continuous and Discrete Variable-Structure Controls for Parallel Three-Phase Boost Boost Rectifier," IEEE Transactions on Industrial Electronics, vol. 52 No. 2, Apr. 2005 pp. 340-354.

Miller, S.K.T. et al., "A Comprehensive Study of Harmonic Cancellation Effects in Interleaved Three-Phase VSCs," Proceedings of IEEE—PESC 2007, Jun. 17-21, 2007, pp. 29-35.

Mohan, N. et al., "Power Electronics: Converters Applications and Design," 2nd Edition, New York: Wiley, 1995, pp. 418-421.

Narayanan, G. et al., "Advanced Bus-Clamping PWM Techniques Based on Space Vector Approach," IEEE Trans. Power Electron., vol. 21 No. 4, Jul. 2006, pp. 974-984.

Narayanan, G. et al., "Space Vector Based Hybrid PWM Techniques for Reduced Current Ripple," IEEE Transactions on Industrial Electronics, vol. 55 No. 4, Apr. 2008, pp. 1614-1627.

Nonaka, S., "A Novel Three-Phase Sinusoidal PWM Voltage Source Inverter and its Application for Photovoltaic Power Generation System," Proceedings of the Power Conversion Conference—Nagaoaka, Aug. 3-6, 1997, pp. 755-758.

Novotny, D.W. et al., Vector Control and Dynamics of AC Drives, New York: Oxford University Press, 1996, pp. 109-117.

Ogasawara, S. et al., "A Novel PWM Scheme of Voltage Source Inverters Based on Space Vector Theory," Proc. EPE, Aachen, Germany, Oct. 1989, pp. 1197-1202.

Saeedifard, M. et al., "Low Switching Frequency Space Vector Modulators for High Power Multimodule Converters," IEEE Transactions on Power Electronics, vol. 20 No. 6, Nov. 2005, pp. 1310-1318.

Wen, J. et al., "Synthesis of Multilevel Converters Based on Single-and/or Three-Phase Converter Building Blocks," IEEE Transactions on Power Electronics, vol. 23 No. 2, May 2008, pp. 1247-1256.

Xing, K. et al., "The Circulating Current in Paralleled Three-Phase Boost PFC Rectifiers," Proceedings of IEEE—PESC 98, vol. 1 May 17-22, 1998, pp. 783-789.

Zhang, D. et al., "Interleaving Impact on Harmonic Current in DC and AC Passive Components of Paralleled Three-Phase Voltage-Source Converters," Proceedings of IEEE—APEC 2008, Feb. 24-28, 2006, pp. 219-225.

Zhao, D. et al., "Switching Loss Characteristics of Sequences Involving Active State Division in Space Vector Based PWM," Proc. IEEE—APEC, Anaheim, CA, Feb. 2004, pp. 479-485.

* cited by examiner

Ψ̄ TRAJECTORY q - AXIS RIPPLE (Ψ$_q$)

d - AXIS RIPPLE (Ψ$_d$)

| QUASI-OPTIMAL SVM SCHEME FOR TWO MODULE CONVERTER |||| 
|---|---|---|---|
| SECTOR | ZONE | SVM SEQUENCE | PHASE |
| SECTOR I | 0°-30° | 2721 | 180° |
|  | 30°-60° | 1012 | 180° |
| SECTOR II | 60°-90° | 3032 | 180° |
|  | 90°-120° | 2723 | 180° |
| SECTOR III | 120°-150° | 4743 | 180° |
|  | 150°-180° | 3034 | 180° |
| SECTOR IV | 180°-210° | 5054 | 180° |
|  | 210°-240° | 4745 | 180° |
| SECTOR V | 240°-270° | 6765 | 180° |
|  | 270°-300° | 5056 | 180° |
| SECTOR VI | 300°-330° | 1016 | 180° |
|  | 330°-360° | 6761 | 180° |

*FIG. 17*

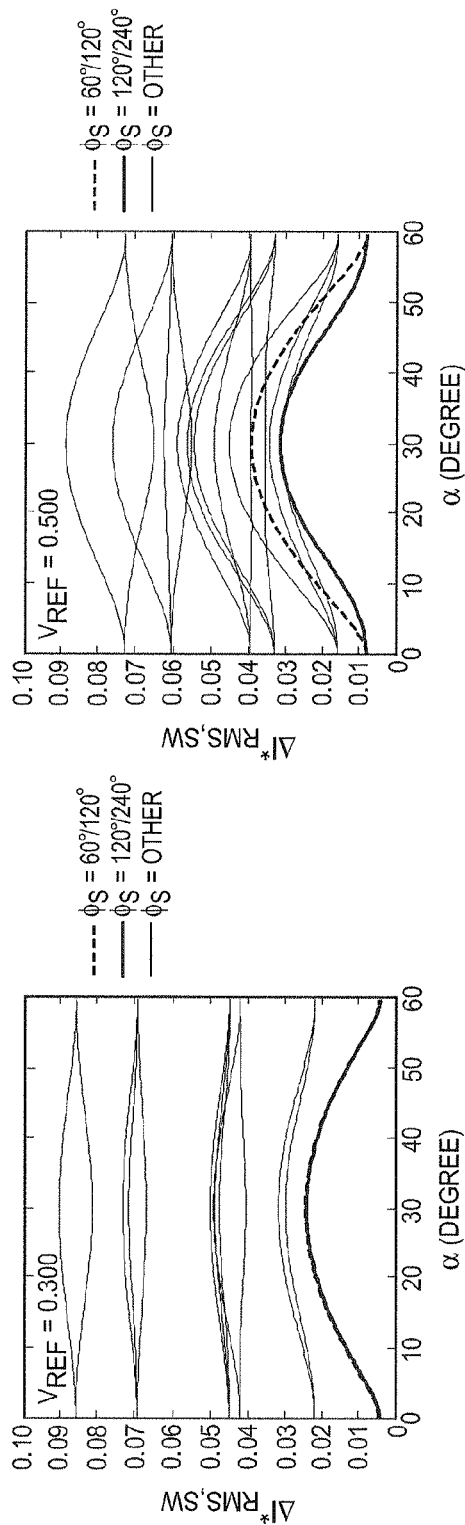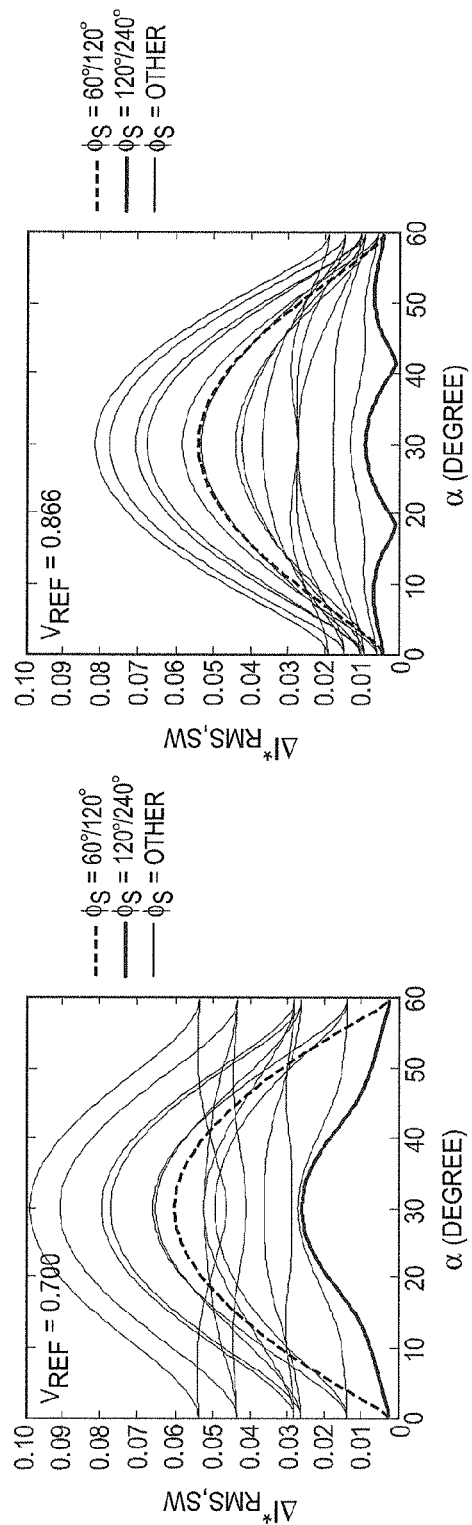

| QUASI-OPTIMAL SVM SCHEME FOR THREE MODULE CONVERTER ||||
|---|---|---|---|
| SECTOR | ZONE || SVM SEQUENCE | PHASE |
| SECTOR I | 0°-30° | 0<$V_{REF}$<0.3 | 012 | 120°/240° |
| | | 0.3<$V_{REF}$<0.6 | 721 | 120°/240° |
| | | $V_{REF}$>0.6 | 012 | 120°/240° |
| | 30°-60° | 0<$V_{REF}$<0.3 | 721 | 120°/240° |
| | | 0.3<$V_{REF}$<0.6 | 012 | 120°/240° |
| | | $V_{REF}$>0.6 | 721 | 120°/240° |
| SECTOR II | 60°-90° | 0<$V_{REF}$<0.3 | 723 | 120°/240° |
| | | 0.3<$V_{REF}$<0.6 | 032 | 120°/240° |
| | | $V_{REF}$>0.6 | 723 | 120°/240° |
| | 90°-120° | 0<$V_{REF}$<0.3 | 032 | 120°/240° |
| | | 0.3<$V_{REF}$<0.6 | 723 | 120°/240° |
| | | $V_{REF}$>0.6 | 032 | 120°/240° |
| SECTOR III | 120°-150° | 0<$V_{REF}$<0.3 | 034 | 120°/240° |
| | | 0.3<$V_{REF}$<0.6 | 743 | 120°/240° |
| | | $V_{REF}$>0.6 | 034 | 120°/240° |
| | 150°-180° | 0<$V_{REF}$<0.3 | 743 | 120°/240° |
| | | 0.3<$V_{REF}$<0.6 | 034 | 120°/240° |
| | | $V_{REF}$>0.6 | 743 | 120°/240° |
| SECTOR IV | 180°-210° | 0<$V_{REF}$<0.3 | 745 | 120°/240° |
| | | 0.3<$V_{REF}$<0.6 | 054 | 120°/240° |
| | | $V_{REF}$>0.6 | 745 | 120°/240° |
| | 210°-240° | 0<$V_{REF}$<0.3 | 054 | 120°/240° |
| | | 0.3<$V_{REF}$<0.6 | 745 | 120°/240° |
| | | $V_{REF}$>0.6 | 054 | 120°/240° |
| SECTOR V | 240°-270° | 0<$V_{REF}$<0.3 | 056 | 120°/240° |
| | | 0.3<$V_{REF}$<0.6 | 765 | 120°/240° |
| | | $V_{REF}$>0.6 | 056 | 120°/240° |
| | 270°-300° | 0<$V_{REF}$<0.3 | 765 | 120°/240° |
| | | 0.3<$V_{REF}$<0.6 | 056 | 120°/240° |
| | | $V_{REF}$>0.6 | 765 | 120°/240° |
| SECTOR VI | 300°-330° | 0<$V_{REF}$<0.3 | 761 | 120°/240° |
| | | 0.3<$V_{REF}$<0.6 | 016 | 120°/240° |
| | | $V_{REF}$>0.6 | 761 | 120°/240° |
| | 330°-360° | 0<$V_{REF}$<0.3 | 016 | 120°/240° |
| | | 0.3<$V_{REF}$<0.6 | 761 | 120°/240° |
| | | $V_{REF}$>0.6 | 016 | 120°/240° |

*FIG. 23*

HYBRID SPACE VECTOR PWM SCHEMES FOR INTERLEAVED THREE-PHASE CONVERTERS

RELATED APPLICATIONS

This application claims the benefit of provisional patent application Ser. No. 61/322,139, filed Apr. 8, 2010, the disclosure of which is hereby incorporated herein by reference in its entirety.

GOVERNMENT SUPPORT

This invention was made with government funds under contract number N00014-08-C-0253 (Phase II SBIR) awarded by the Office of Naval Research. The U.S. Government may have rights in this invention.

FIELD OF THE DISCLOSURE

The present disclosure relates to three-phase converters and more specifically relates to a hybrid Space Vector Pulse Width Modulation (SVM) control scheme for interleaved, parallel connected three-phase converters.

BACKGROUND

Three-phase Voltage Source Converters (VSCs) generally operate to convert Direct Current (DC) to three-phase Alternating Current (AC), where power can be transferred either from a DC source to an AC grid or load or vice versa. Three-phase VSCs are widely used in adjustable speed motor drives, uninterruptible power supplies, and grid integration of renewable and distributed resources such as solar photovoltaics. For three-phase VSCs using a switching frequency much higher than the fundamental frequency, Space Vector Pulse Width Modulation (SVM) is a popular switching modulation technique. Further, modular three-phase VSCs formed by two or more interleaved, parallel connected VSCs are also becoming increasingly popular due to advantages of reduced voltage or current ratings for the switching devices, reduced current or voltage ripple (hence smaller filter size) by utilizing interleaving, unified design and increased reliability, lower cost and inventory due to standardization, increased redundancy and limp home capability, and distributed thermal load.

One key metric for high performance VSCs is Total Harmonic Distortion (THD). THD is a total distortion in the line current injected from the VSC into the connected load or grid. The main component of THD is the harmonics of the switching frequency ($f_{sw}$) (i.e., $f_{sw}$, $2 \cdot f_{sw}$, etc.). Thus, there is a desire to reduce these harmonics of the switching frequency. However, traditionally, there has been a tradeoff between reducing these harmonics and increasing switching losses. More specifically, traditionally, the harmonics of the switching frequency have been reduced by increasing the switching frequency, which in turn increases switching losses.

Thus, there is a need for a modular three-phase converter having low THD without substantially increasing switching losses.

SUMMARY

The present disclosure relates to a hybrid Space Vector Pulse Width Modulation (SVM) control scheme for a modular three-phase converter. In general, the modular three-phase converter includes two or more interleaved, parallel connected three-phase Voltage Source Converters (VSCs). A SVM controller is connected to the modular three-phase converter and operates to control the two or more interleaved, parallel connected three-phase VSCs based on the hybrid SVM control scheme. For the hybrid SVM control scheme, six active vectors utilized for SVM define six sectors in a space vector plane. Each sector is divided into two or more regions having corresponding optimal SVM switching sequences. In one embodiment, the two or more regions for each sector are quasi-optimal zones having corresponding optimal SVM switching sequences that optimize a desired characteristic of the modular three-phase converter. In one embodiment, the desired characteristic is low Total Harmonic Distortion (THD) in a total line current of the modular three-phase converter. In operation, the SVM controller samples a revolving reference voltage vector to provide a reference voltage vector. The SVM controller then identifies one of the regions in one of the sectors that corresponds to an angle and, in some embodiments, a magnitude of the reference voltage vector and applies the corresponding optimal SVM switching sequence to the two or more interleaved, parallel connected three-phase VSCs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 7:
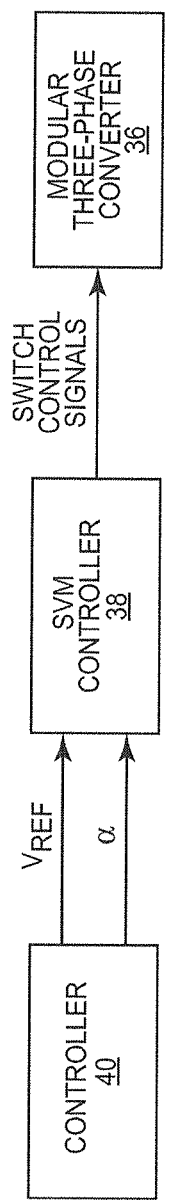
FIG. 7 illustrates a modular three-phase converter controlled by a SVM controller according to a hybrid SVM control scheme according to one embodiment of the present disclosure.
Figure 9:
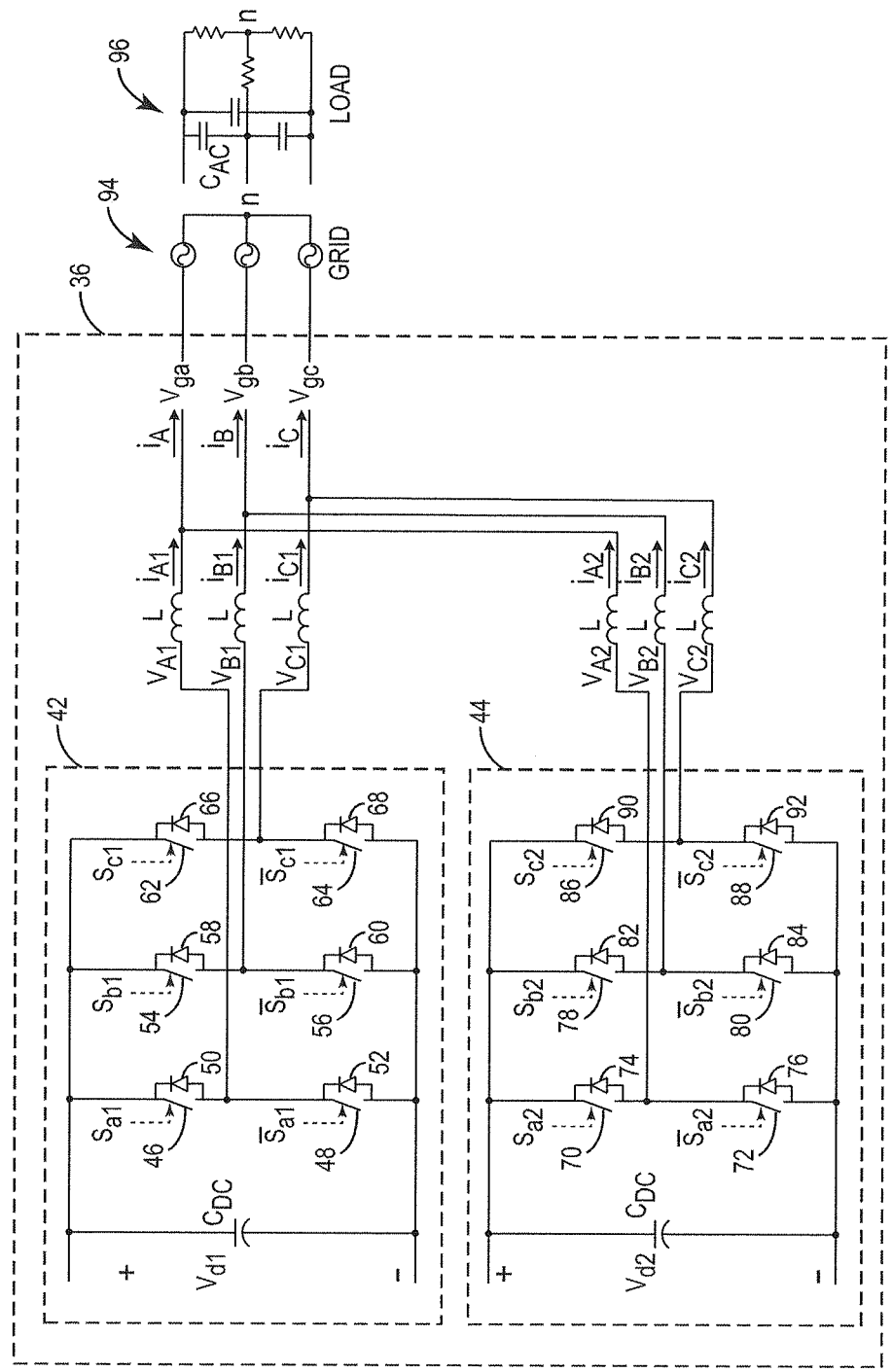
FIG. 9 illustrates the modular three-phase converter of FIG. 7 according to one embodiment of the present disclosure wherein the modular three-phase converter includes two interleaved, parallel connected VSCs.
Figure 13A:
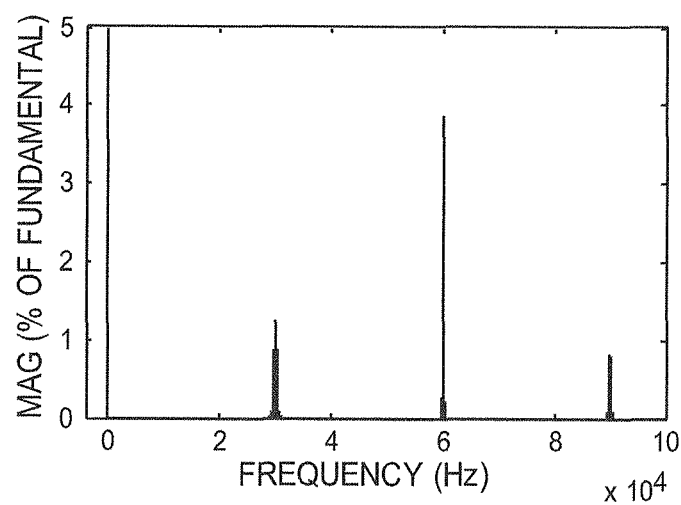
Figure 13B:
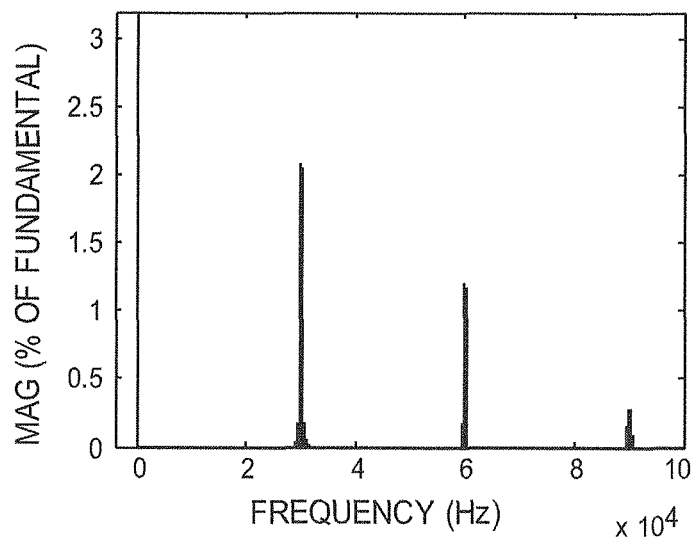
Figure 14A:
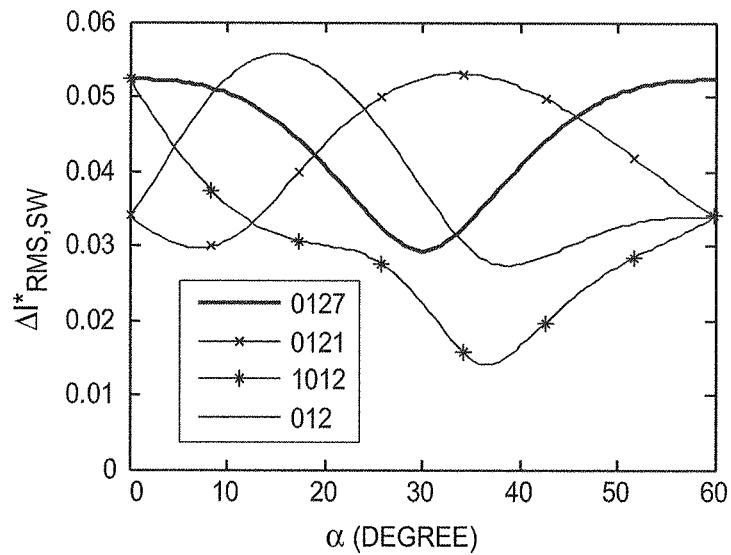
Figure 14B:
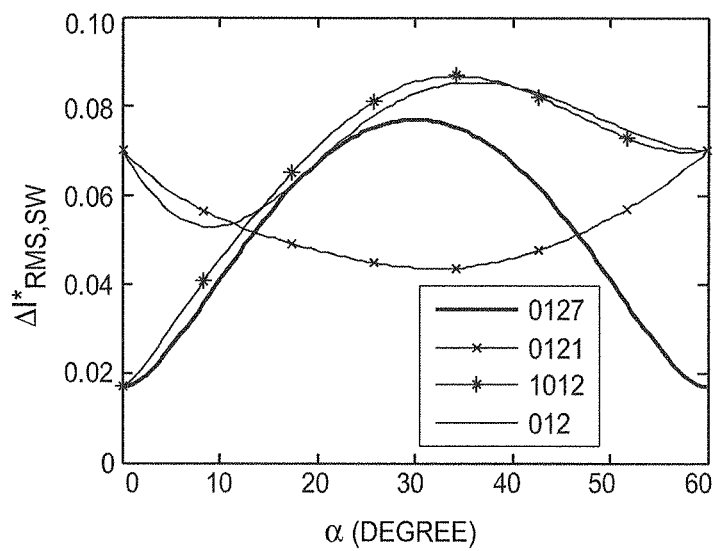
Figure 15:
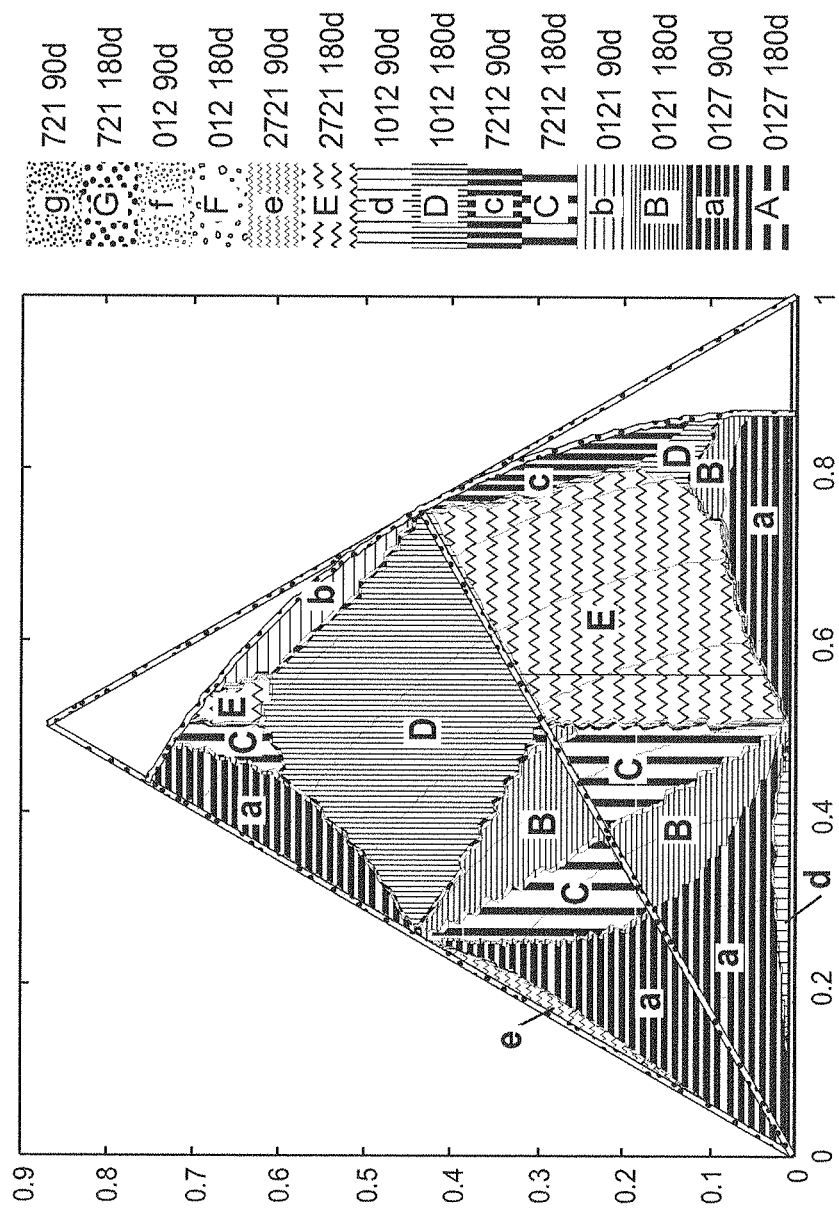
Figure 16:
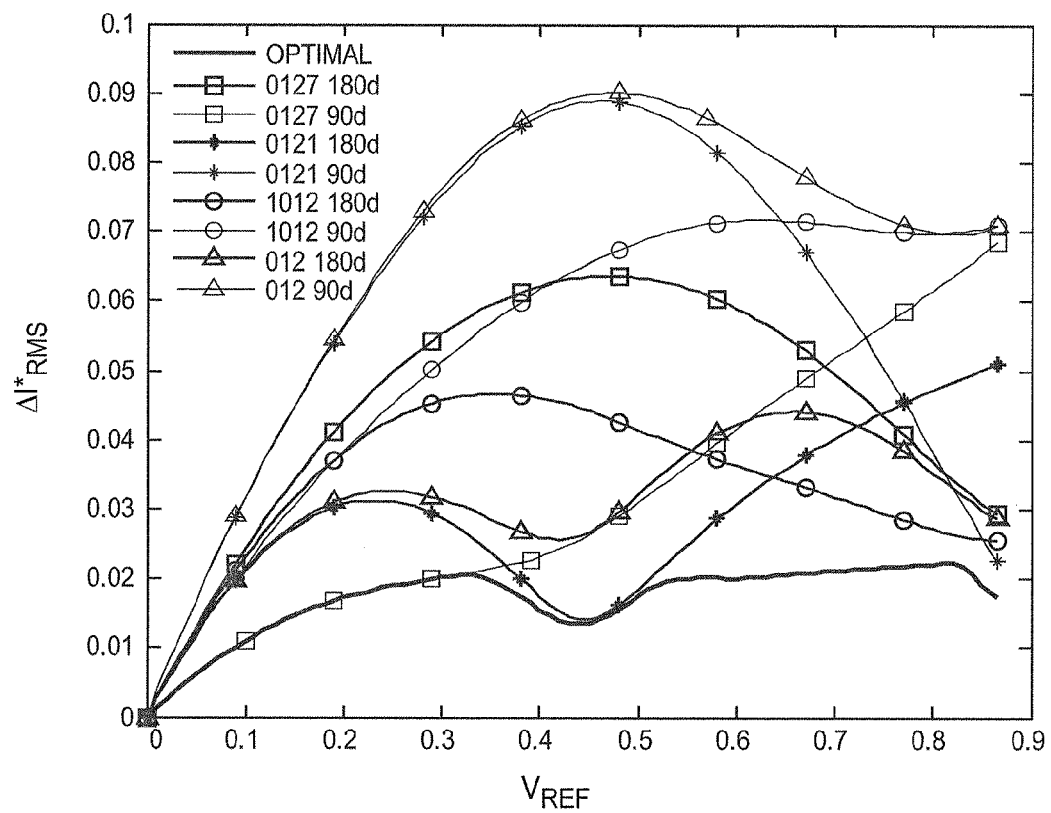
Figure 18:
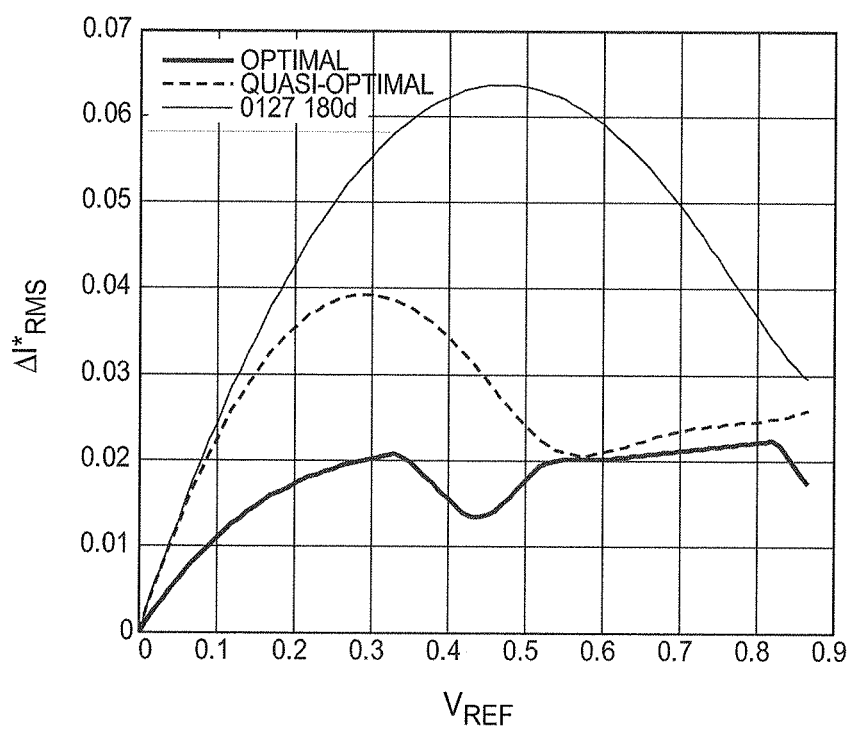
Figure 19:
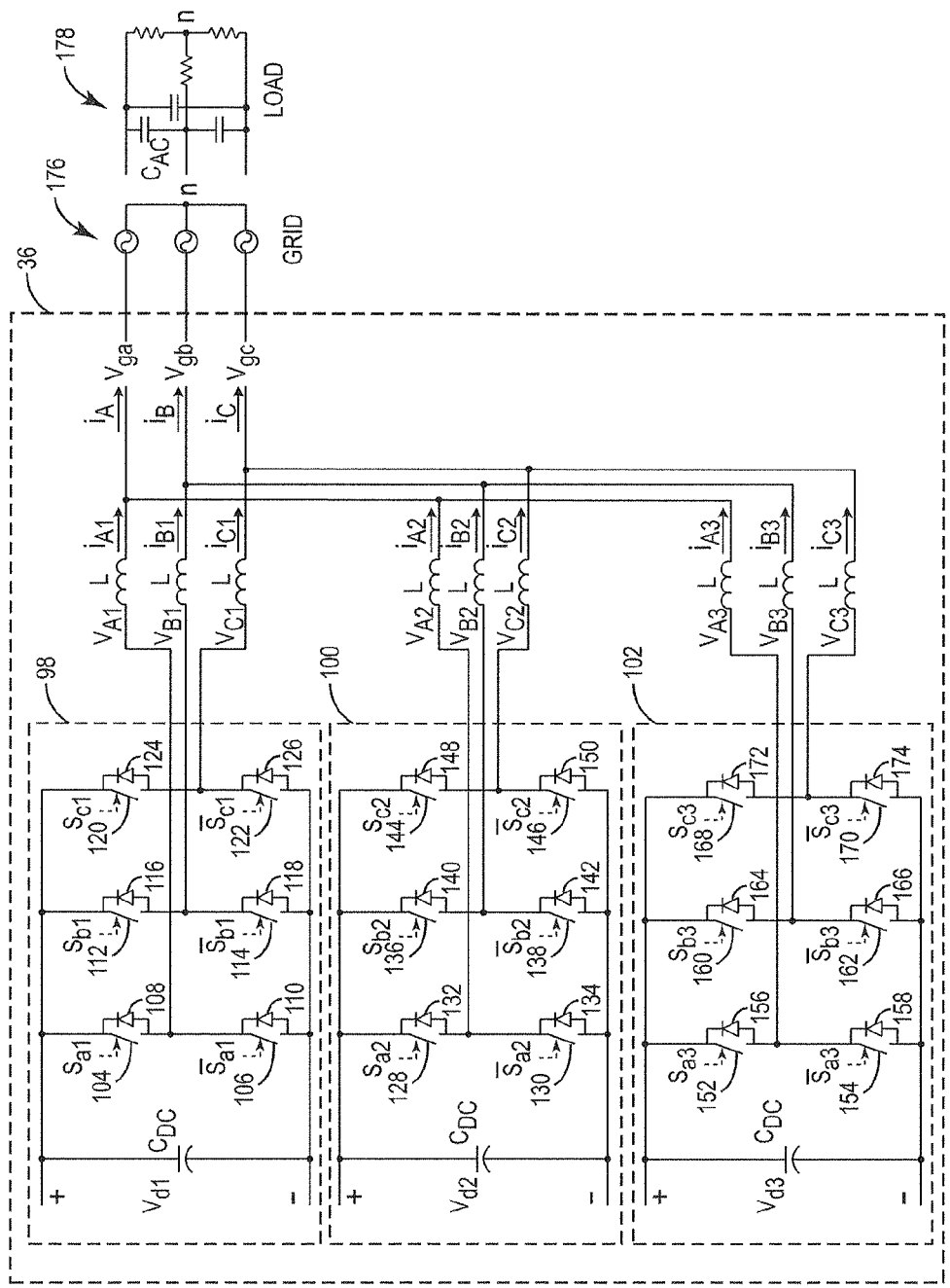
Figure 21:
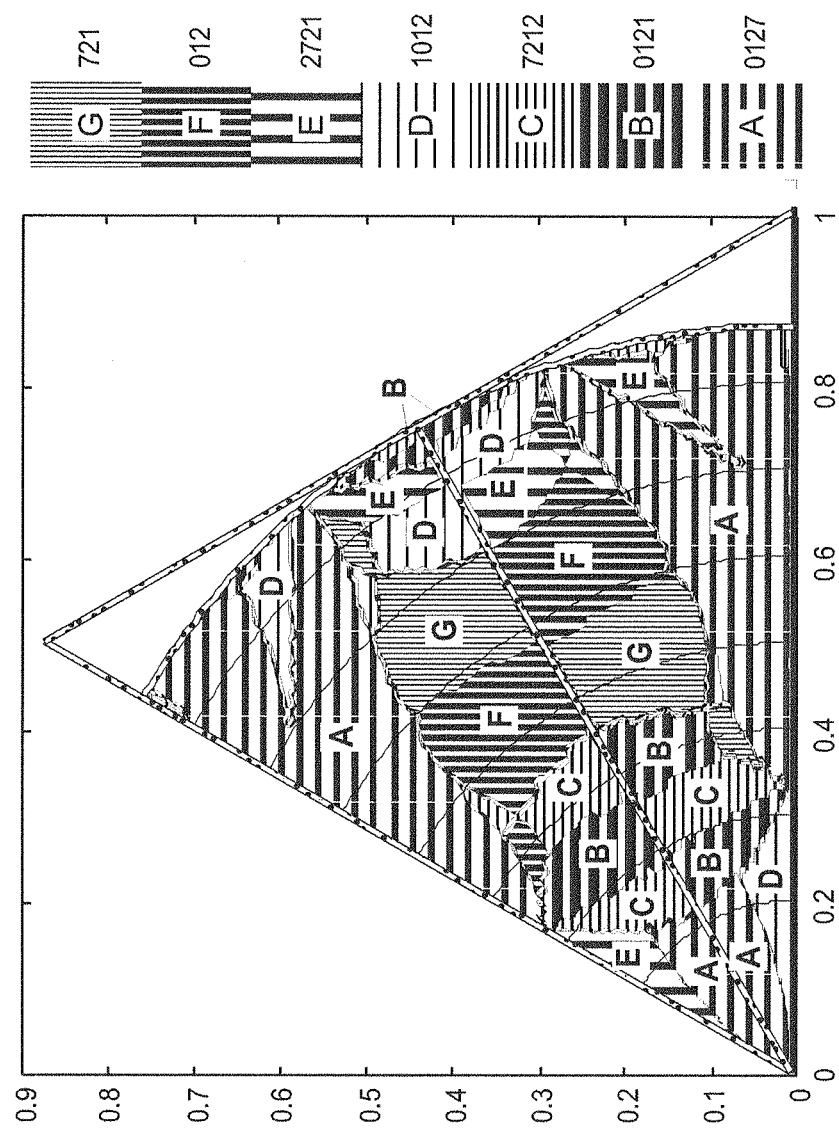
Figure 22:
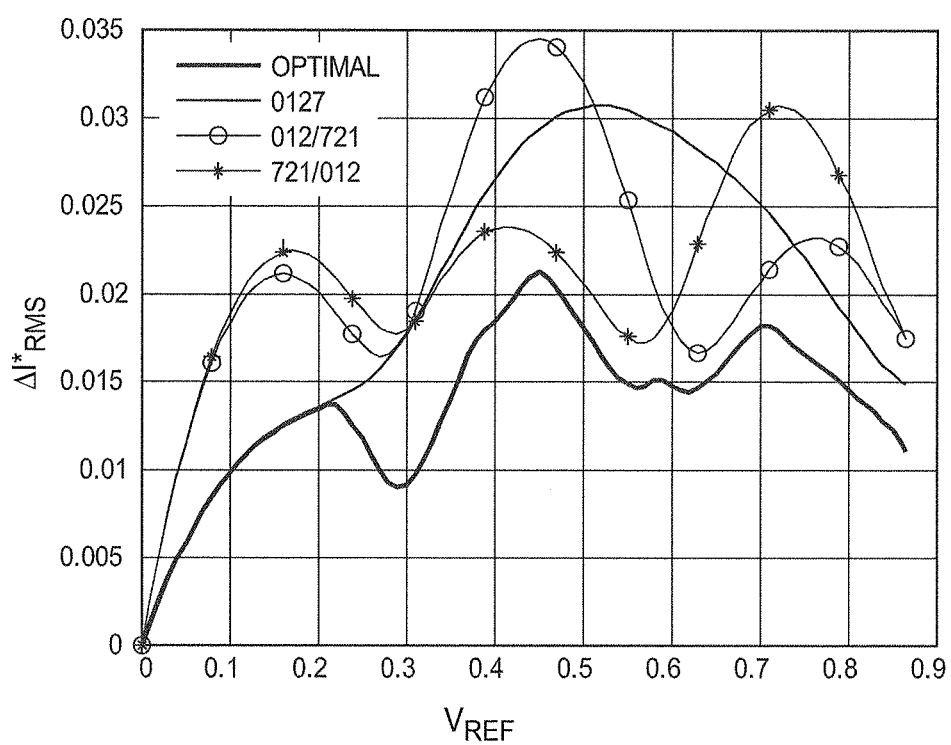
Figure 24:
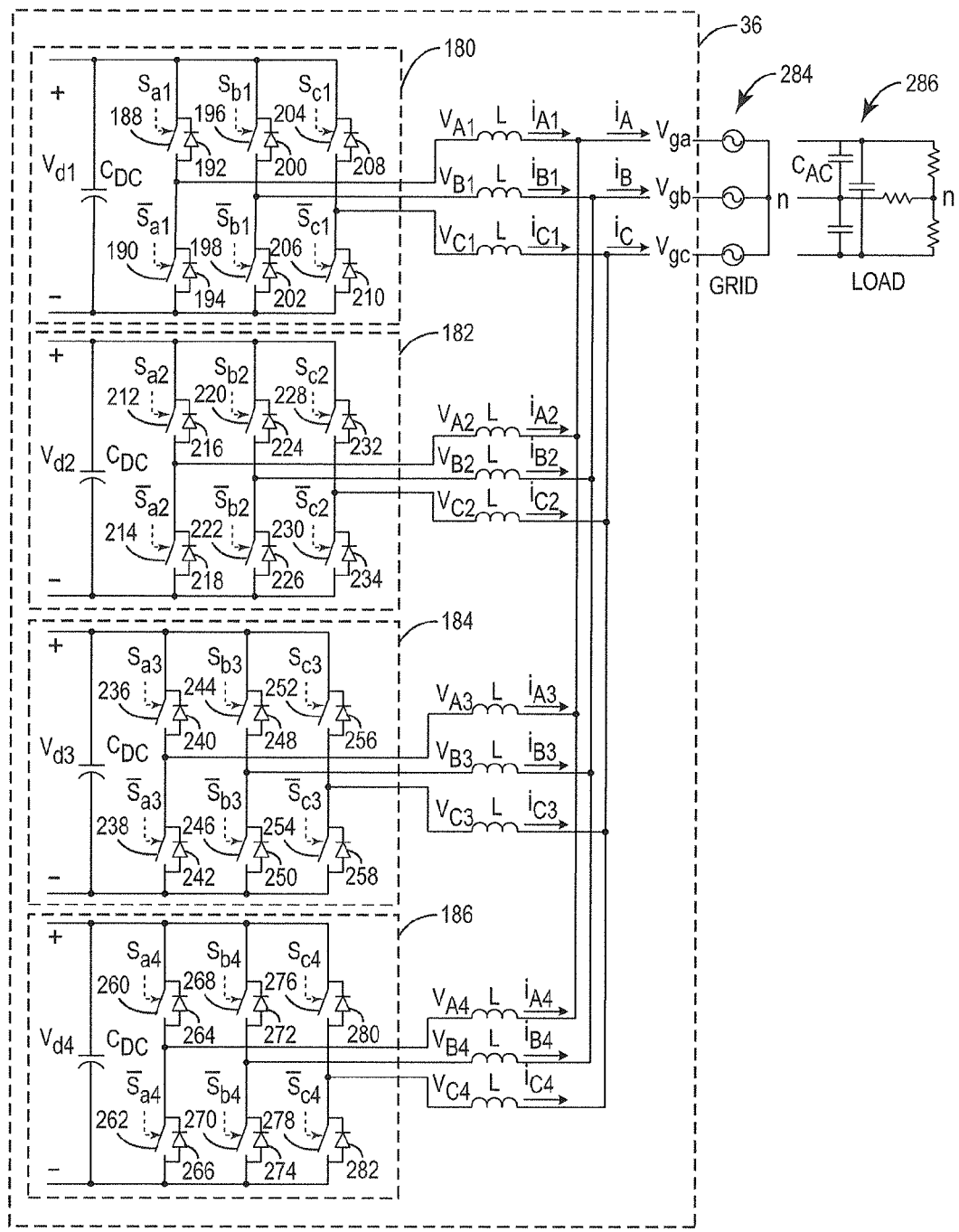
Figure 25B:
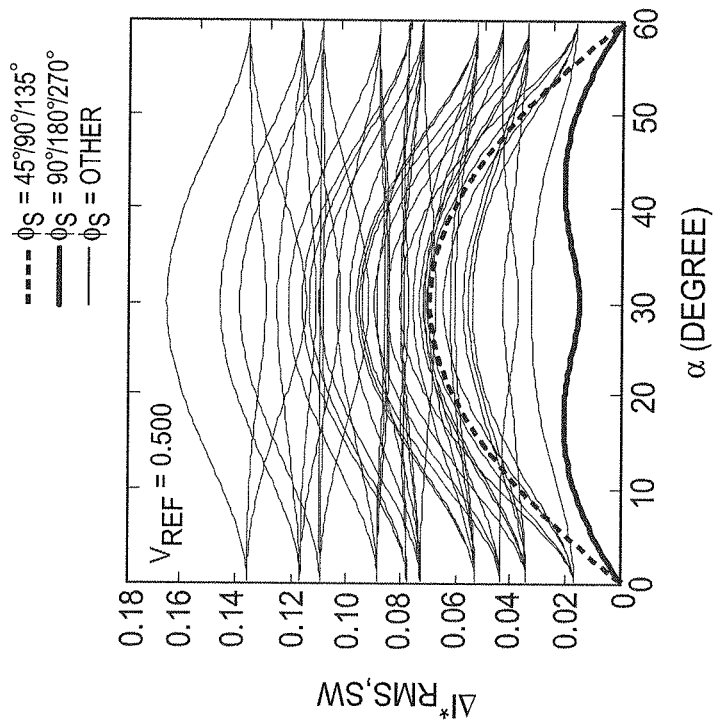
Figure 25A:
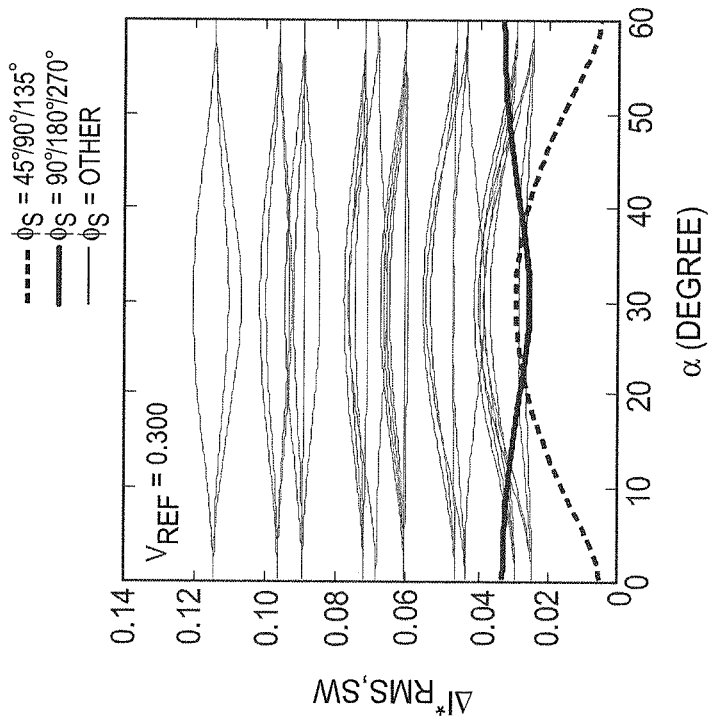
Figure 25C:
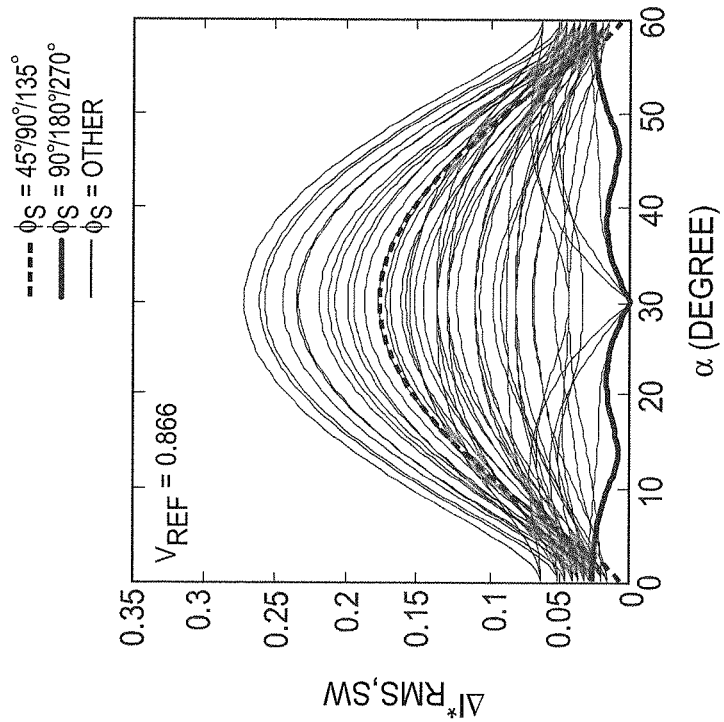
Figure 25D:
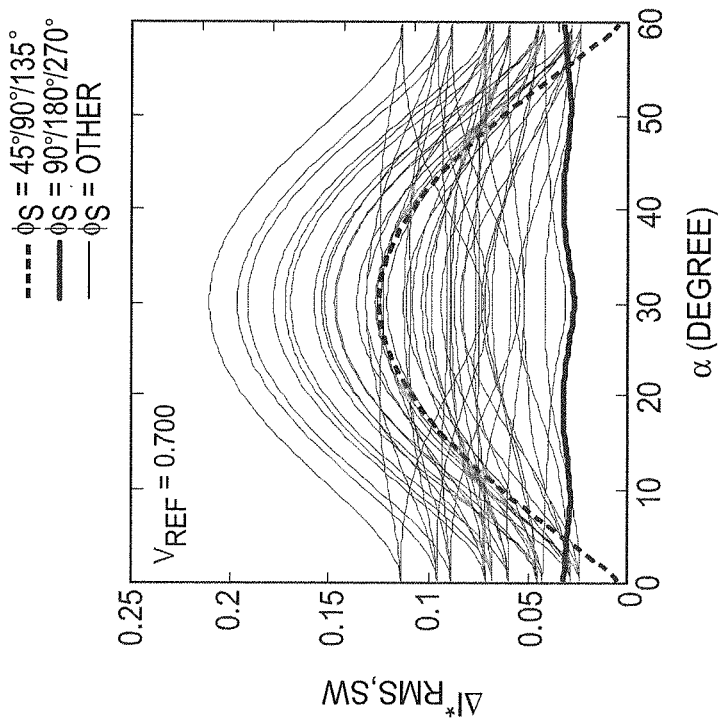
Figure 26:
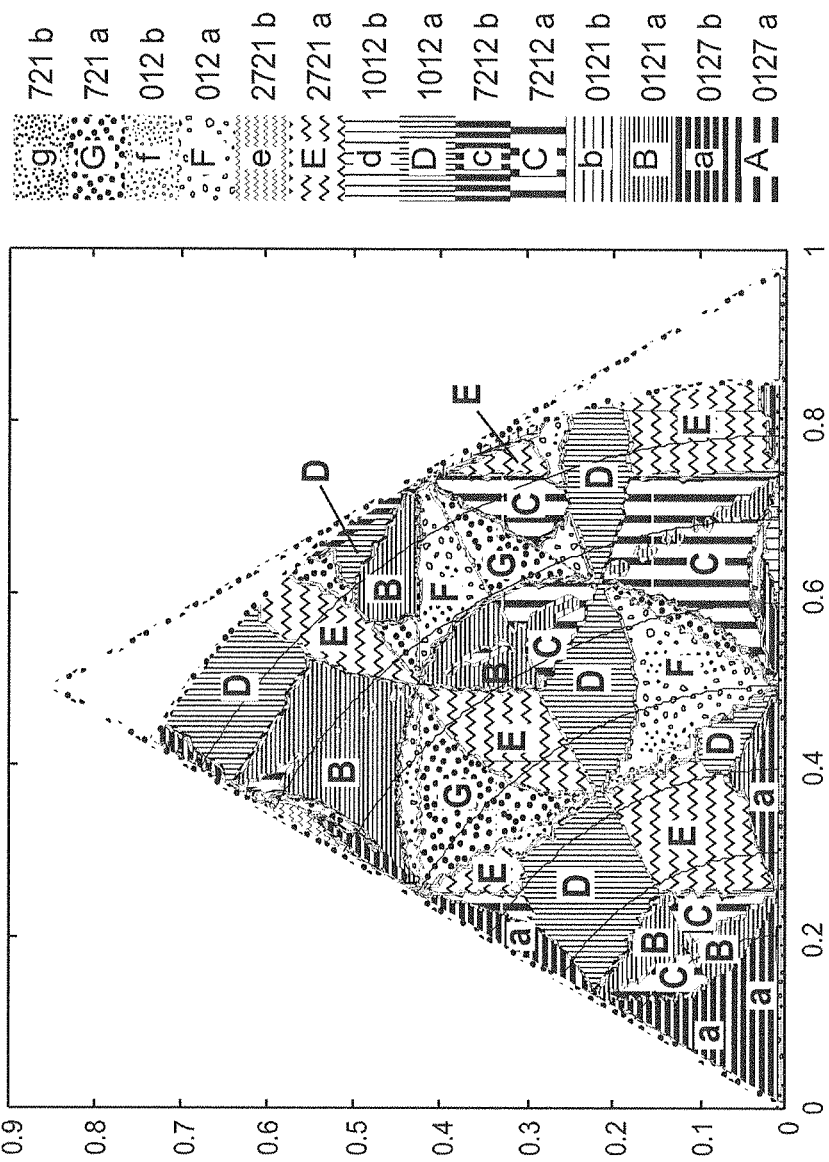
Figure 27:
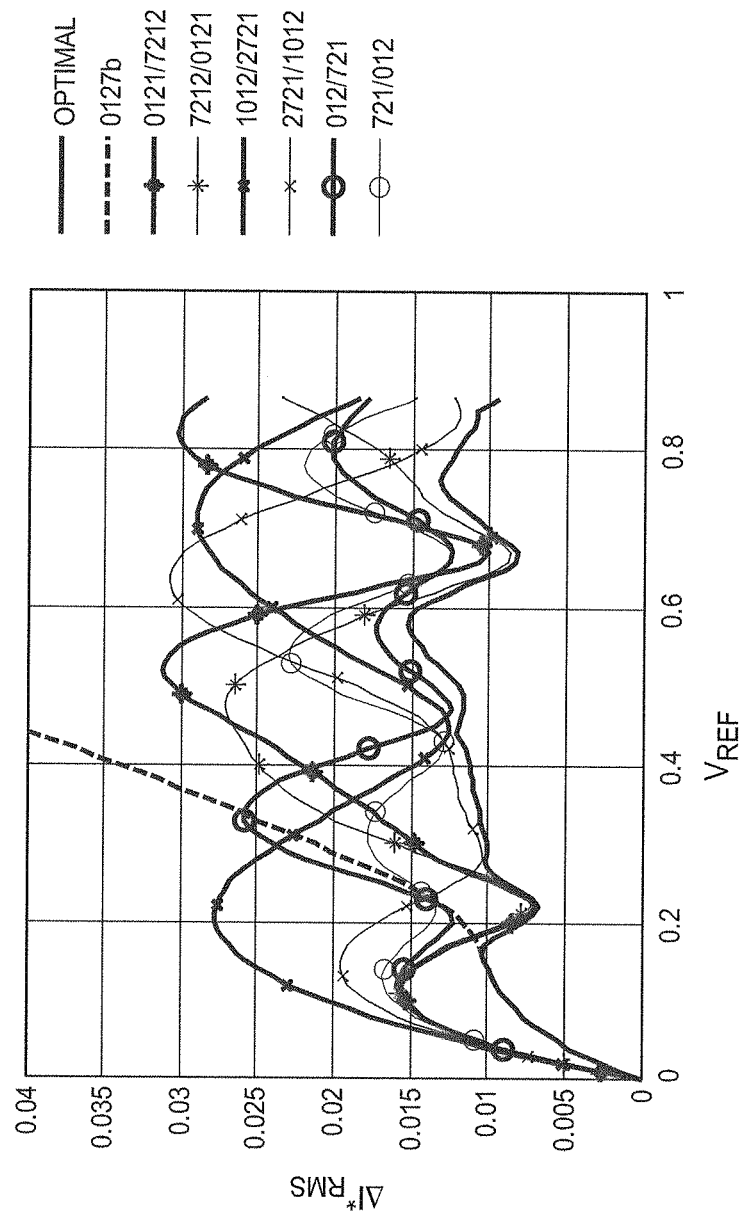
Figure 28:
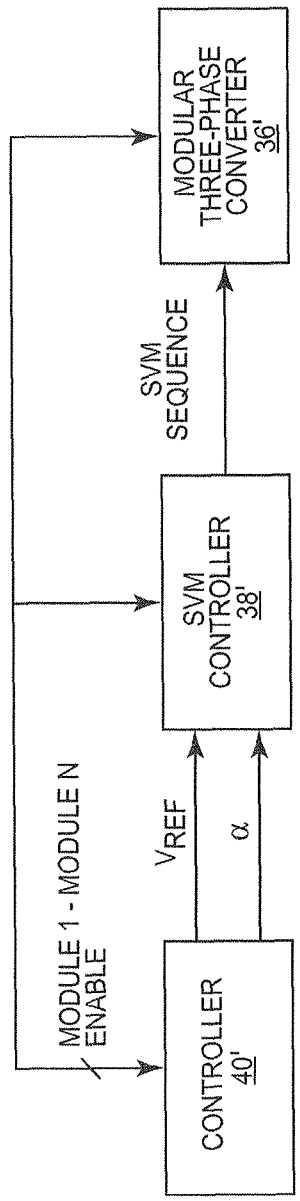

FIGS. 12A through 12D graphically illustrate a normalized Root Mean Squared (RMS) ripple over a switching cycle of a total line current of the two interleaved, parallel connected VSCs of FIG. 9 with different phase shifts for the conventional SVM switching sequence of 0127 at varying reference voltage magnitudes;

FIGS. 13A and 13B graphically illustrate a frequency spectrum of individual converter current for the conventional SVM sequence 0127 for two different reference voltage magnitudes;

FIGS. 14A and 14B provide a graphical comparison of RMS ripple of the total line current of the two interleaved, parallel VSCs of FIG. 9 due to SVM switching sequences 0127, 0121, 1012, and 012 for a static reference voltage magnitude and phase shifts of 180 degrees and 90 degrees, respectively;

FIG. 15 is a zone division plot that illustrates optimal SVM switching sequences and phase shifts for corresponding zones within sector 1 for the two interleaved, parallel connected VSCs of FIG. 9 for an optimal hybrid SVM control scheme according to one embodiment of the present disclosure;

FIG. 16 graphically compares the total RMS current ripple between the different SVM switching sequences and the optimal SVM control scheme for the two interleaved, parallel connected VSCs of FIG. 9 according to one embodiment of the present disclosure;

FIG. 17 illustrates a quasi-optimal hybrid SVM control scheme utilized by the SVM controller to control the two interleaved, parallel connected VSCs of FIG. 9 according to one embodiment of the present disclosure;

FIG. 18 graphically compares the total RMS current ripple between the quasi-optimal hybrid SVM control scheme of FIG. 17, the optimal hybrid SVM control scheme represented by the zone division plot of FIG. 15, and the conventional control scheme according to one embodiment of the present disclosure;

FIG. 19 illustrates the modular three-phase converter of FIG. 7 according to another embodiment of the present disclosure wherein the modular three-phase converter includes three interleaved, parallel connected VSCs;

FIGS. 20A through 20D graphically illustrate normalized RMS ripple over a switching cycle of a total line current of the three interleaved, parallel connected VSCs of FIG. 19 with different phase shifts for the conventional SVM switching sequence of 0127 at varying reference voltage magnitudes;

FIG. 21 is a zone division plot that illustrates optimal SVM switching sequences and phase shifts for corresponding zones within sector 1 for the three interleaved, parallel connected VSCs of FIG. 19 for an optimal SVM control scheme according to one embodiment of the present disclosure;

FIG. 22 graphically compares the total RMS current ripple between two simplified hybrid SVM control schemes, the optimal hybrid SVM control scheme represented by the zone division plot of FIG. 21, and the conventional control scheme according to one embodiment of the present disclosure;

FIG. 23 illustrates a quasi-optimal hybrid SVM control scheme utilized by the SVM controller to control the three interleaved, parallel connected VSCs of FIG. 19 according to one embodiment of the present disclosure;

FIG. 24 illustrates the modular three-phase converter of FIG. 7 according to yet another embodiment of the present disclosure wherein the modular three-phase converter includes four interleaved, parallel connected VSCs;

FIGS. 25A through 25D graphically illustrate normalized RMS current ripple over a switching cycle of a total line current of the four interleaved, parallel connected VSCs of FIG. 24 with different phase shifts for the conventional SVM switching sequence of 0127 at varying reference voltage magnitudes;

FIG. 26 is a zone division plot that illustrates optimal SVM switching sequences and phase shifts for corresponding zones within sector 1 for the four interleaved, parallel connected VSCs of FIG. 24 for an optimal hybrid SVM control scheme according to one embodiment of the present disclosure;

FIG. 27 graphically compares the total RMS current ripple between the possible SVM switching sequences, the optimal hybrid SVM control scheme represented by the zone division plot of FIG. 26, and the conventional control scheme that can be used to develop a desired quasi-optimal control scheme for the four interleaved, parallel connected VSCs of FIG. 24 according to one embodiment of the present disclosure; and FIG. 28 illustrates a modular three-phase converter having a configurable or dynamic number of interleaved, parallel connected VSCs controlled by a SVM controller according to a hybrid SVM control scheme according to another embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to a hybrid Space Vector Pulse Width Modulation (SVM) control scheme for a modular three-phase converter. In general, the modular three-phase converter includes two or more interleaved, parallel connected three-phase Voltage Source Converters (VSCs). A SVM controller is connected to the modular three-phase converter and operates to control the two or more interleaved, parallel connected three-phase VSCs based on the hybrid SVM control scheme. For the hybrid SVM control scheme, six active vectors utilized for SVM define six sectors in a space vector plane. Each sector is divided into two or more regions having corresponding optimal SVM switching sequences. In one embodiment, the two or more regions for each sector are quasi-optimal zones having corresponding optimal SVM switching sequences that optimize a desired characteristic of the modular three-phase converter, which in the preferred embodiment is low Total Harmonic Distortion (THD) in a total line current of the modular three-phase converter. In operation, the SVM controller samples a revolving reference voltage vector to provide a reference voltage vector. The SVM controller then identifies one of the regions in one of the sectors that corresponds to an angle and, in some embodiments, a magnitude of the reference voltage vector and applies the corresponding optimal SVM switching sequence to the two or more interleaved, parallel connected three-phase VSCs.

Figure 1:
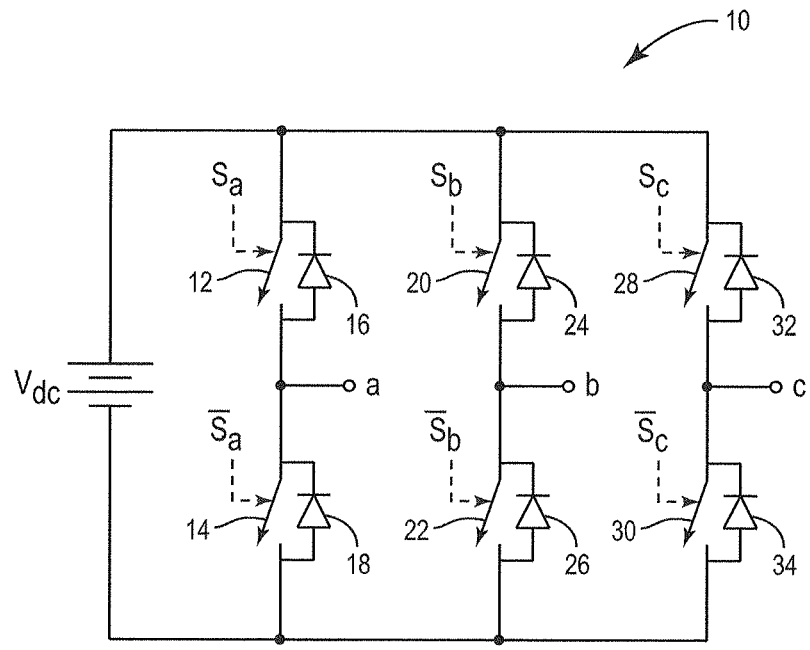
FIG. 1 illustrates an exemplary three-phase Voltage Source Converter (VSC)

Before discussing the details of the hybrid SVM control scheme for a modular VSC that includes two or more interleaved, parallel connected VSCs, a discussion of a single VSC 10 and SVM of the single VSC 10 is provided with respect to FIGS. 1 through 6C. FIG. 1 illustrates one embodiment of the VSC 10. As illustrated, the VSC 10 includes an a-leg formed by switches 12 and 14 and diodes 16 and 18 connected as shown, a b-leg formed by switches 20 and 22 and diodes 24 and 26 connected as shown, and a c-leg formed by switches 28 and 30 and diodes 32 and 34 connected as shown. The switches 12, 14, 20, 22, 28, and 30 may be implemented as, for example, Insulated Gate Bipolar Transistors (IGBTs), but are not limited thereto. The switches 12, 20, and 28 are controlled by switch control signals $S_a$, $S_b$, and $S_c$, respectively. Conversely, the switches 14, 22, and 30 are controlled by inverses of the switch control signals $S_a$, $S_b$, and $S_c$, which are designated as switch control signals $\overline{S}_a$, $\overline{S}_b$, and $\overline{S}_c$. As such, at no time are two switches in the same leg on. The VSC 10 converts a Direct Current (DC) voltage ($V_{dc}$) to three-phase Alternating Current (AC) at nodes a, b, and c.

Figure 2:
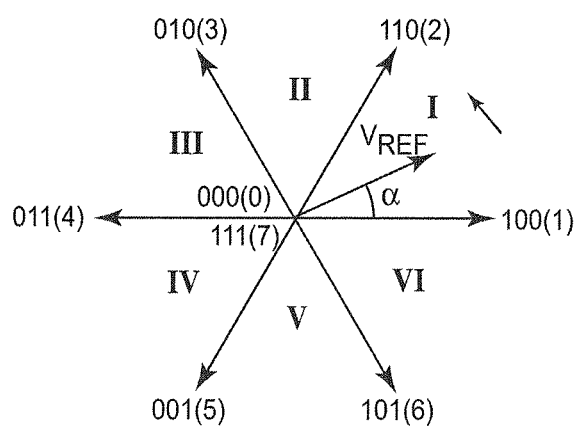
FIG. 2 illustrates six active space vectors and two zero space vectors utilized for Space Vector Pulse Width Modulation (SVM) of a three-phase VSC.

FIG. 2 illustrates space vectors utilized for SVM of the VSC 10. More specifically, the VSC 10 of FIG. 1 has eight discrete switching states, which are referred to as eight space vectors. The eight space vectors are 000 which is referred to as space vector 0, 100 which is referred to as space vector 1, 110 which is referred to as space vector 2, 010 which is referred to as space vector 3, 011 which is referred to as space vector 4, 001 which is referred to as space vector 5, 101 which is referred to as space vector 6, and 111 which is referred to as space vector 7 as illustrated in FIG. 2. Space vectors 0 and 7 are referred to as zero space vectors, and space vectors 1 through 6 are referred to as active space vectors. The six active space vectors (space vectors 1 through 6) are of equal magnitude and divide the space vector plane (i.e., the plane in which the active space vectors lie) into six sectors designated as sectors I, II, III, IV, V, and VI.

For SVM, a revolving reference voltage vector ($\overline{v}_{REF}$), which has a reference voltage magnitude $V_{REF}$ and a reference angle ($\alpha$), is sampled with sample time $T_s$ once in a subcycle, or half switching cycle. Each sample of the revolving reference voltage vector ($\overline{v}_{REF}$) is synthesized as a time average of the two nearest active space states and a zero state (i.e., one or both of the zero space vectors) over $T_s$ by a corresponding SVM switching sequence that is applied to the VSC 10. For instance, with reference to FIG. 2 where the revolving reference voltage vector ($\overline{v}_{REF}$) is in sector I, time durations $T_1$, $T_2$, and $T_z$ of the space vector 1, space vector 2, and the zero state, respectively, can be calculated using the following equation:

$$T_1 = V_{REF} \frac{\sin(60° - \alpha)}{\sin(60°)} T_S \qquad \text{Eqn. (1)}$$

$$T_2 = V_{REF} \frac{\sin(\alpha)}{\sin(60°)} T_S$$

$$T_Z = T_S - T_1 - T_2$$

where $V_{REF}$ is the magnitude of the revolving reference voltage vector ($\overline{v}_{REF}$) normalized with respect to the magnitude of the active space vectors (i.e., space vectors 1 through 6) and $\alpha$ is the angle of the revolving reference voltage vector ($\overline{v}_{REF}$).

Figure 3A:
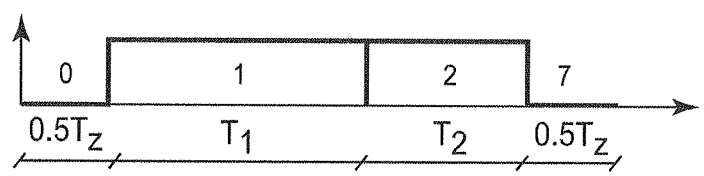
FIGS. 3A through 3C illustrate a conventional SVM switching sequence and two clamped SVM switching sequences, respectively, utilized for SVM of a three-phase VSC.
Figure 3B:
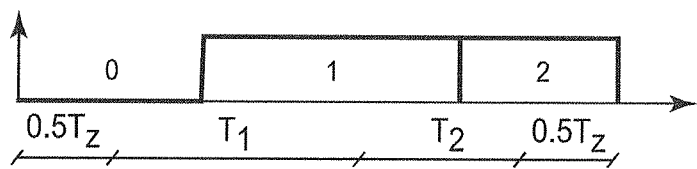
Figure 3C:
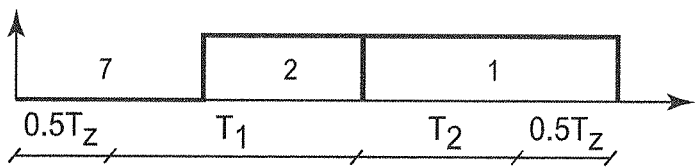
Figure 4A:
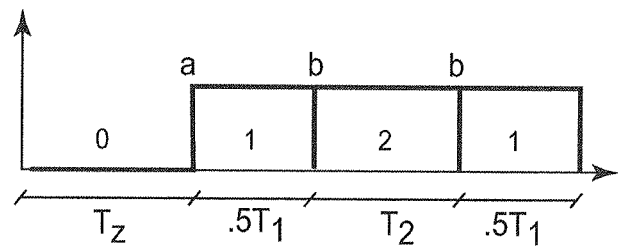
FIGS. 4A through 4D illustrate four active state division SVM switching sequences utilized for SVM of a three-phase VSC.
Figure 4B:
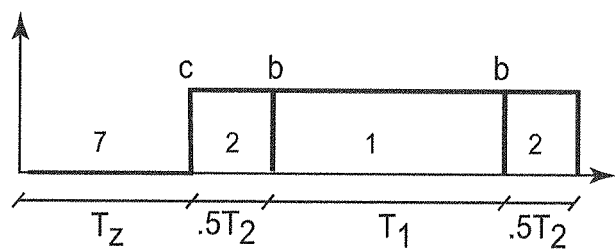
Figure 4C:
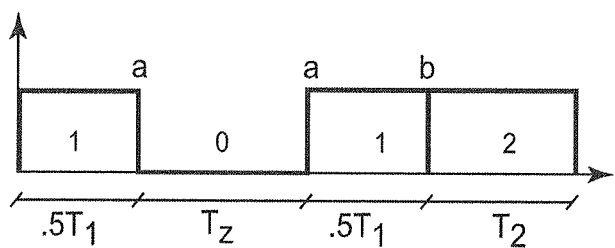
Figure 4D:
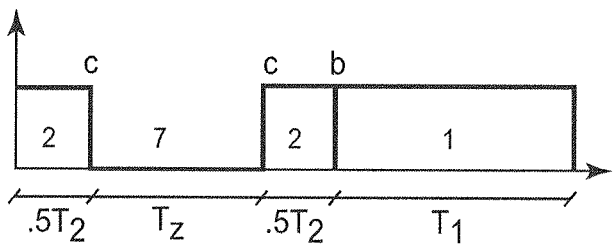

In one SVM technique, $T_z$ is equally divided between space vector 0 and space vector 7, which forms the SVM switching sequence 0127 as shown in FIG. 3A. The 0127 SVM switching sequence is referred to herein as the conventional SVM switching sequence. When the SVM switching sequence 0127 is applied to the VSC 10, first, the space vector 0 is applied to the VSC 10 (i.e., $S_a$, $S_b$, and $S_c$ are set to 0 and $\overline{S}_a$, $\overline{S}_b$, and $\overline{S}_c$ are set to 1) for the duration of $0.5 \cdot T_z$, then the space vector 1 is applied to the VSC 10 (i.e., $S_a$ set to 1, $S_b$, and $S_c$ set to 0, $\overline{S}_a$ set to 0, and $\overline{S}_b$ and $\overline{S}_c$ set to 1) for the duration $T_1$, then the space vector 2 is applied to the VSC 10 (i.e., $S_a$ and $S_b$ set to 1, $S_c$ set to 0, $\overline{S}_a$ and $\overline{S}_b$ set to 0, and $\overline{S}_c$ set to 1) for the duration of $T_2$, and then the space vector 7 is applied to the VSC 10 (i.e., $S_a$, $S_b$, and $S_c$ are set to 1 and $\overline{S}_a$, $\overline{S}_b$, and $\overline{S}_c$ are set to 0) for the duration of $0.5 \cdot T_z$. In another SVM technique, none of the time durations $T_1$, $T_2$, or $T_z$ is divided, which forms the SVM switching sequences 012 and 721 as illustrated in FIGS. 3B and 3C, respectively.

In yet another SVM technique, SVM switching sequences that divide either $T_1$ or $T_2$ into two halves may be used. These sequences, called SVM switching sequences involving active state division, are the SVM switching sequences 0121, 7212, 1012, and 2721 illustrated in FIGS. 4A through 4D, respectively. The switching sequences of FIGS. 3A through 3C and FIGS. 4A through 4D are used to provide the hybrid SVM control scheme, as described below in detail. Further, while FIGS. 3A through 3C and FIGS. 4A through 4D illustrate the possible SVM switching sequences for sector I, similar switching sequences are used for the other sectors (i.e., sectors II through VI) as will be appreciated by one of ordinary skill in the art upon reading this disclosure.

Figure 5:
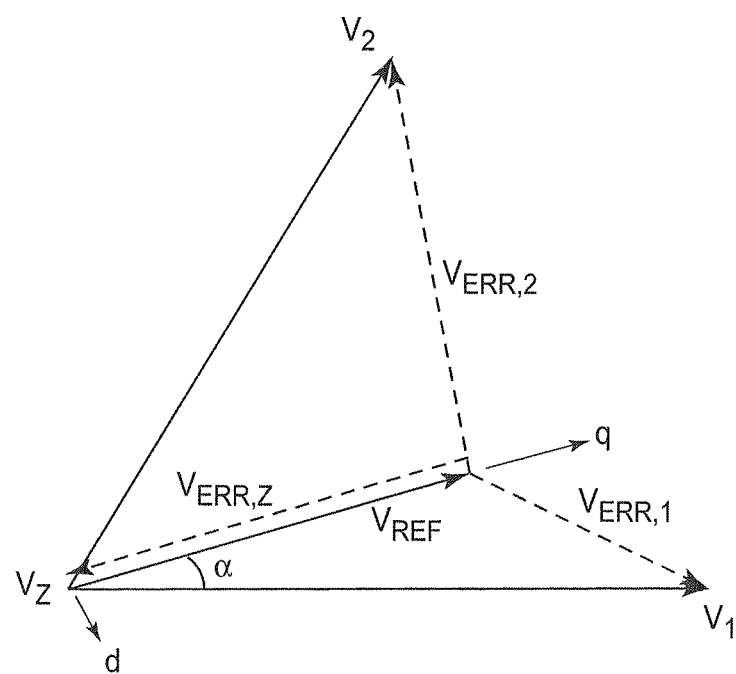
FIG. 5 illustrates error voltage vectors that define an error between an instantaneous applied voltage vector (i.e., one of the eight space vectors) and a reference voltage vector.

During operation of the VSC 10, an error between an instantaneous voltage vector applied to the VSC 10 (i.e., one of the eight space vectors) and the revolving reference voltage vector ($\overline{v}_{REF}$) causes a current ripple in a total line current provided by the VSC 10. More specifically, this error is represented by a number of error voltage vectors. As illustrated in FIG. 5, for the given revolving reference voltage vector ($\overline{v}_{REF}$) in FIG. 2, the error voltage vectors corresponding to the active space, or voltage, vectors $V_1$, $V_2$, and $V_Z$ are designated as $V_{ERR,1}$, $V_{ERR,2}$, and $V_{ERR,Z}$, respectively.

Figure 6A:
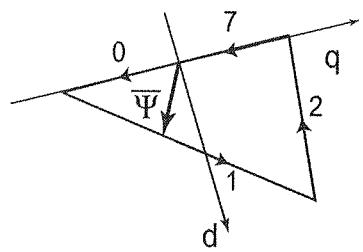
FIGS. 6A through 6C illustrate a stator flux ripple of a VSC over a subcycle for SVM switching sequence 0127.
Figure 6B:
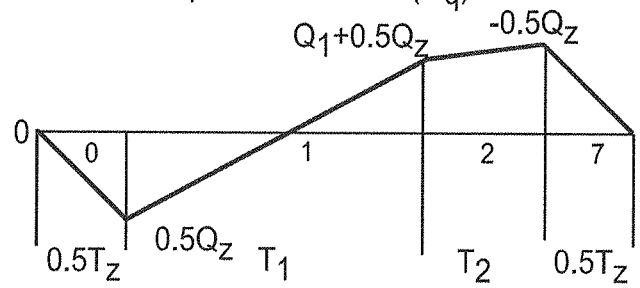
Figure 6C:
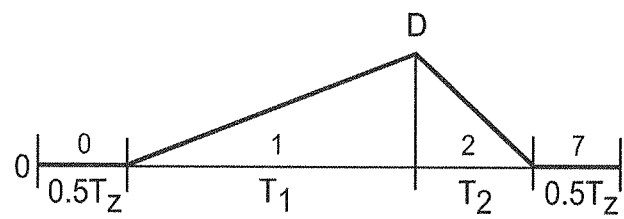

The time integral of an error voltage vector is referred to as the "stator flux ripple vector," and is a direct measure of the ripple in the line currents of the VSC 10, as shown below. FIGS. 6A through 6C show the stator flux ripple vector ($\overline{\Psi}$) over a subcycle for the SVM switching sequence 0127 for a given reference vector ($V_{REF}=0.65$, $\alpha=15°$) and its components resolved along the d-axis and q-axis, which are the axes of a synchronous reference frame with the q-axis aligned with the revolving reference voltage vector and the d-axis lagging the q-axis by 90°. Note that the magnitude of $\overline{\Psi}$ is zero at the start as well as the end of the subcycle. Similar stator flux ripple plots are known for the other six SVM switching sequences.

Error voltage-second quantities $Q_Z$, $Q_1$, $Q_2$ and D illustrated in FIGS. 6B and 6C are defined as:

$$Q_1 = [\cos(\alpha) - V_{REF}]T_1$$

$$Q_2 = [\cos(60° - \alpha) - V_{REF}]T_2$$

$$Q_Z = -V_{REF}T_Z$$

$$D = \sin(\alpha)T_1 \qquad \text{Eqn. (2)}$$

To evaluate Root Mean Squared (RMS) current ripple over a subcycle, mean square stator flux ripple ($F^2$) over a subcycle is defined as:

$$F^2 = F_q^2 + F_d^2 = \frac{1}{T_S}\int_0^{T_S} \Psi_q^2 dt + \frac{1}{T_S}\int_0^{T_S} \Psi_d^2 dt \qquad \text{Eqn. (3)}$$

Note that $F^2$ has a unit of $sec^2$ since normalized voltages are used in Equation (2). Further, expressions for the mean square stator flux ripple ($F^2$) over a subcycle for the other SVM switching sequences can be similarly derived.

For most VSC applications, it is a good approximation to assume that all the ripple voltage drops across an inductor (L) (e.g., a filter inductor in a line connected inverter or machine inductance in a motor drive). With this assumption, it can be shown that the mean square stator flux ripple ($F^2$) and the mean square of the current ripple over a subcycle ($\Delta I_{RMSm,sub}^2$) have the following relationship:

$$\Delta I_{RMS,sub}^2 = \frac{1}{T_S}\int_0^{T_S}\{[\Delta i_a(t)]^2 + [\Delta i_b(t)]^2 + [\Delta i_c(t)]^2\}dt \quad \text{Eqn. (4)}$$
$$= \frac{2V_d^2}{3L^2}F^2$$

where $V_d$ is the DC bus voltage.

To obtain a dimensionless quantity so that the effects of L, $V_d$, and $T_s$ on the current ripple are eliminated for convenience of comparing the current ripple performances of different SVM switching sequences, we define a normalized RMS current ripple over a subcycle as:

$$\Delta I_{RMS,sub}^* = \Delta I_{RMS,sub}\frac{L}{\sqrt{3}\,V_d T_S} \quad \text{Eqn. (5)}$$

where $\sqrt{3}$ is used to obtain the normalized current ripple of one phase. In the discussion below, the current ripple performance is provided using this normalized value.

The RMS of the normalized current ripple over a full sector is calculated by:

$$\Delta I_{RMS}^* = \sqrt{\frac{3}{\pi}\int_0^{\pi/3}(\Delta I_{RMS,sub}^*)^2 d\alpha} \quad \text{Eqn. (6)}$$

The THD of the current is then given by:

$$THD = \frac{\Delta I_{RMS}}{I_{1,RMS}} = \frac{\sqrt{3}\,V_d T_S \Delta I_{RMS}^*}{L I_{1,RMS}} \quad \text{Eqn. (7)}$$

where $I_{1,RMS}$ is the RMS fundamental current.

FIG. 7 illustrates a modular three-phase converter 36 that is controlled by a SVM controller 38 according to a hybrid SVM control scheme according to one embodiment of the present disclosure. In the preferred embodiment, the hybrid SVM control scheme is a quasi-optimal hybrid SVM control scheme. However, in another embodiment, the hybrid SVM control scheme is an optimal hybrid SVM control scheme. The modular three-phase converter 36 includes two or more interleaved, parallel connected VSCs. In this embodiment, a controller 40 generates a revolving reference voltage vector ($\bar{v}_{REF}$) having a reference voltage magnitude ($V_{REF}$) and an angle ($\alpha$) using any suitable control technique for a VSC. The SVM controller 38 is preferably implemented in hardware or a combination of hardware and software. The SVM controller 38 samples the revolving reference voltage vector ($\bar{v}_{REF}$) with sample time $T_s$ once in a subcycle, or half switching cycle. Each sample of the revolving reference voltage vector ($\bar{v}_{REF}$) is synthesized as a time average of the two nearest active states and the zero state over $T_s$ by an optimal SVM switching sequence that is applied to the modular three-phase converter 36. The optimal SVM switching sequence is selected based on the revolving reference voltage vector ($\bar{v}_{REF}$) according to the hybrid SVM control scheme to provide a desired characteristic for the modular three-phase converter 36. In the preferred embodiment described herein, the desired characteristic is minimized, or at least substantially reduced, THD.

Figure 8:
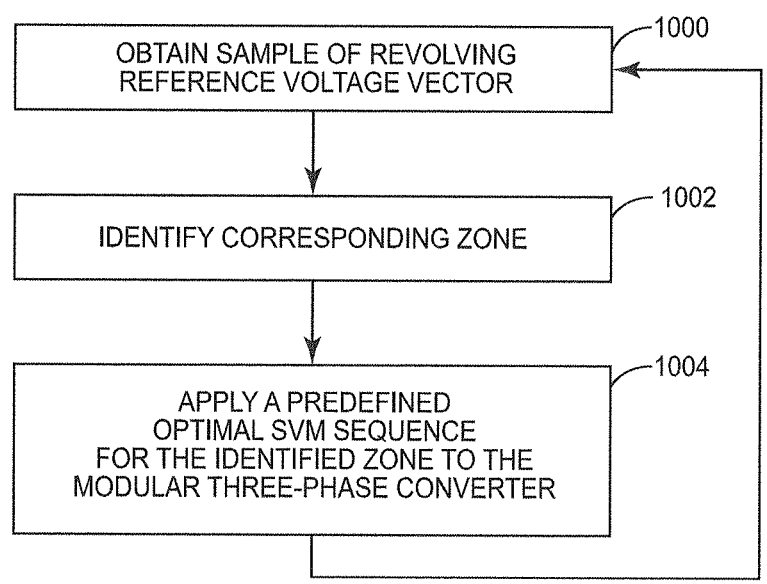
FIG. 8 is a flow chart illustrating the hybrid SVM control scheme according to one embodiment of the present disclosure.

FIG. 8 illustrates the operation of the SVM controller 38 of FIG. 7 to control the modular three-phase converter 36 utilizing a hybrid SVM control scheme according to one embodiment of the present disclosure. As discussed below in detail, the hybrid SVM control scheme divides each of the six sectors (sectors I through VI) in the space vector plane defined by the six active vectors (space vectors 1 through 6) into two or more zones, or regions. In one embodiment, the zones are optimal zones. In another more preferred embodiment, the zones are quasi-optimal zones. Each zone of each sector has a predefined optimal SVM switching sequence that minimizes, or at least substantially reduces, THD for that zone. Thus, during operation, the SVM controller 38 obtains a sample of the revolving reference voltage vector ($\bar{v}_{REF}$) (step 1000). The SVM controller 38 then identifies a corresponding zone of a corresponding sector in the space vector plane (step 1002). The SVM controller 38 then applies the optimal SVM switching sequence for the identified zone to the modular three-phase converter 36 by providing corresponding switch control signals to the modular three-phase converter 36 (step 1004). Notably, as discussed above, with respect to Equation (1), the durations (e.g., $T_1$, $T_2$, and $T_z$ for sector I) of each space, or voltage, vector in the optimal SVM switching sequence depends on the magnitude and angle of the revolving reference voltage vector ($\bar{v}_{REF}$). The process then returns to step 1000 and is repeated for the next sample of the revolving reference voltage vector ($\bar{v}_{REF}$).

FIGS. 9 through 18 discuss a hybrid SVM control scheme for an embodiment where the modular three-phase converter 36 of FIG. 7 includes two interleaved, parallel connected VSCs 42 and 44. More specifically, FIG. 9 illustrates one embodiment of the modular three-phase converter 36 of FIG. 7 where the modular three-phase converter 36 includes the two interleaved, parallel connected VSCs 42 and 44. As illustrated, the VSC 42 includes an a-leg formed by switches 46 and 48 and diodes 50 and 52 connected as shown, a b-leg formed by switches 54 and 56 and diodes 58 and 60 connected as shown, and a c-leg formed by switches 62 and 64 and diodes 66 and 68 connected as shown. The switches 46, 48, 54, 56, 62, and 64 may be implemented as, for example, IGBTs, but are not limited thereto. The switches 46, 54, and 62 are controlled by switch control signals $S_{a1}$, $S_{b1}$, and $Sd_{c1}$, respectively. Conversely, the switches 48, 56, and 64 are controlled by inverses of the switch control signals $S_{a1}$, $S_{b1}$, and $S_{c1}$, which are designated as switch control signals $\bar{S}_{a1}$, $\bar{S}_{b1}$, and $\bar{S}_{c1}$. As such, at no time are two switches in the same leg on.

Similarly, as illustrated, the VSC 44 includes an a-leg formed by switches 70 and 72 and diodes 74 and 76 connected as shown, a b-leg formed by switches 78 and 80 and diodes 82 and 84 connected as shown, and a c-leg formed by switches 86 and 88 and diodes 90 and 92 connected as shown. The switches 70, 72, 78, 80, 86, and 88 may be implemented as, for example, IGBTs, but are not limited thereto. The switches 70, 78, and 86 are controlled by switch control signals $S_{a2}$, $S_{b2}$, and $S_{c2}$, respectively. Conversely, the switches 72, 80, and 88 are controlled by inverses of the switch control signals $S_{a2}$, $S_{b2}$, and $S_{c2}$, which are designated as switch control signals $\bar{S}_{a2}$, $\bar{S}_{b2}$, and $\bar{S}_{c2}$. As such, at no time are two switches in the same leg on. Notably, the switch control signals $S_{a2}$, $S_{b2}$, and $S_{c2}$ are the same as the switch control signals $S_{a1}$, $S_{b1}$, and $S_{c1}$ but phase shifted by phase $\phi_s$.

Outputs of the VSCs 42 and 44 are coupled via inductors (L) as illustrated to provide AC voltages $v_{ga}$, $V_{gb}$, and $v_{gc}$. The AC voltages $v_{ga}$, $V_{gb}$, and $v_{gc}$ are at the fundamental line frequency (e.g., 60 Hz) and may represent the voltage of a power system grid 94 or the voltage across a load 96 (e.g., a large filter capacitor) with negligible voltage ripple. Notably, the hybrid SVM control scheme described herein may be combined with coupling (e.g., tight coupling) between the inductors (L) to provide further enhancements. This is true for the two, three, or four converter embodiments.

Figure 10:
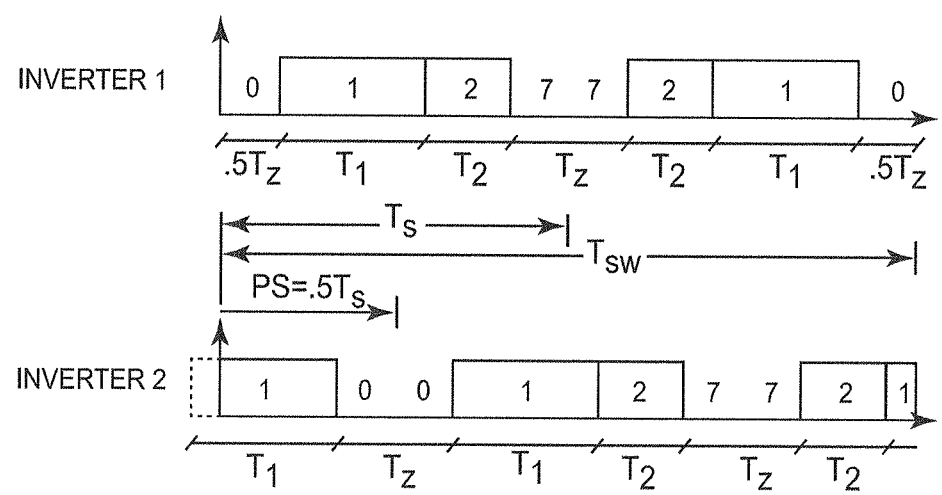
FIG. 10 illustrates the conventional 0127 SVM switching sequence for the two interleaved, parallel connected VSCs of FIG. 9 with a phase shift of ninety degrees.

As illustrated in FIG. 10, the two VSCs 42 and 44 use the same sampled revolving reference voltage vector ($\bar{v}_{REF}$) as well as the same SVM switching sequence (e.g., the 0127 SVM switching sequence), but the switching of the VSC 44 lags that of the VSC 42 by a certain phase angle ($\phi_s$), which in FIG. 10 is 90°. Here, $\phi_s=360°$ corresponds to one switching time period $T_{SW}=2T_S$. Consequently, the stator flux ripple vector ($\Psi$), and its q-axis and d-axis components, of the VSC 44 also lags those of the VSC 42 by $\phi_s$. Applying superposition, the ripple of the total current corresponds to the sum of the two stator flux ripple vectors.

Figure 11A:
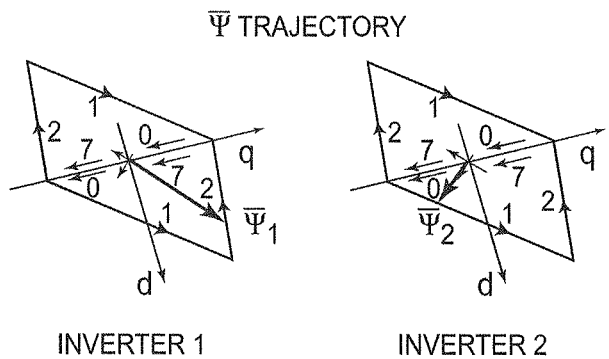
FIGS. 11A through 11C illustrate stator flux trajectories and total stator flux ripple over a switching cycle for the two interleaved, parallel connected VSCs of FIG. 9 for the conventional 0127 SVM switching sequence with a phase shift of ninety degrees.
Figure 11B:
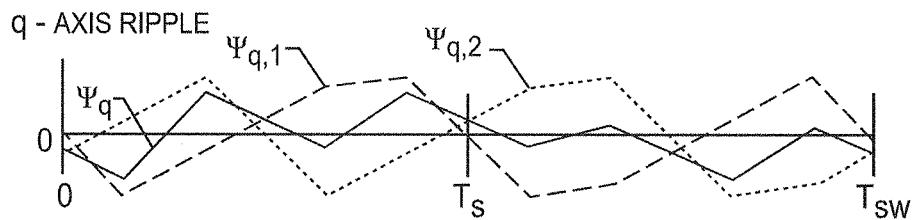
Figure 11C:
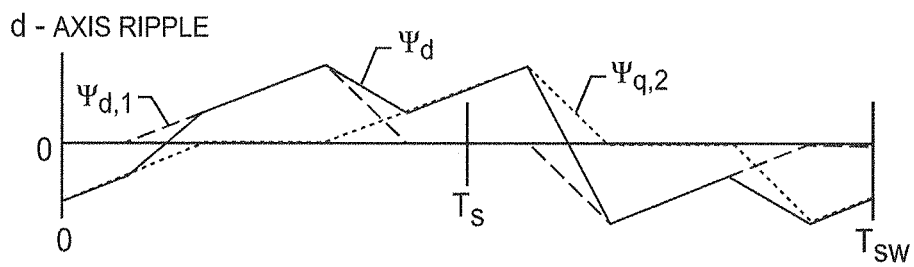

FIGS. 11A through 11C illustrate the $\Psi$ trajectories and the individual and total d-axis and q-axis stator flux ripple over a full switching cycle for the two interleaved, parallel connected VSCs 42 and 44 for the SVM switching sequence 0127. The plots in FIGS. 11B and 11C correspond to a condition of $V_{REF}=0.65$, $\alpha=15°$ and a phase shift of $\phi_s=90°$. In the single converter case of FIGS. 6A, 6B, and 6C, the current ripple is plotted for only a subcycle since the current ripple for the other subcycle, where sequence 721 is employed, is anti-symmetric to it about the point ($T_S$, 0) (as seen from $\Psi_{q,1}$ and $\Psi_{d,1}$ in FIGS. 11A through 11C) and thus has the same RMS value. For the two converter embodiment it is necessary to analyze the stator flux ripple for a full switching cycle since generally it does not have such symmetry. In fact it can be shown that it is anti-symmetric about the point ($T_S+T_{SW}\cdot\phi_s/720°$, 0), which depends on the phase shift.

As with the single-converter case, the q-axis and d-axis stator flux ripple are piecewise linear for parallel converters. The mean square of the stator flux ripple ($F^2$) over a switching cycle can be calculated in the same way as with the single-converter case. The closed form expression for $F^2$, however, is much more complicated, but can be calculated numerically. Then, Equations (4) and (5) are used to calculate the normalized RMS current ripple over one switching cycle, denoted as $\Delta I^*_{RMS,sw}$. The results are presented below.

Figure 12A:
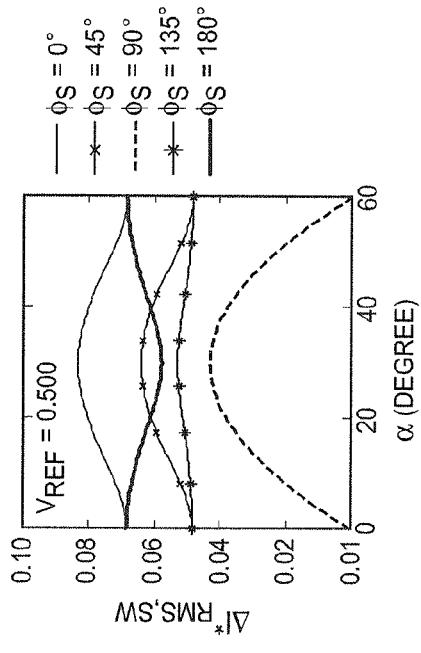
Figure 12C:
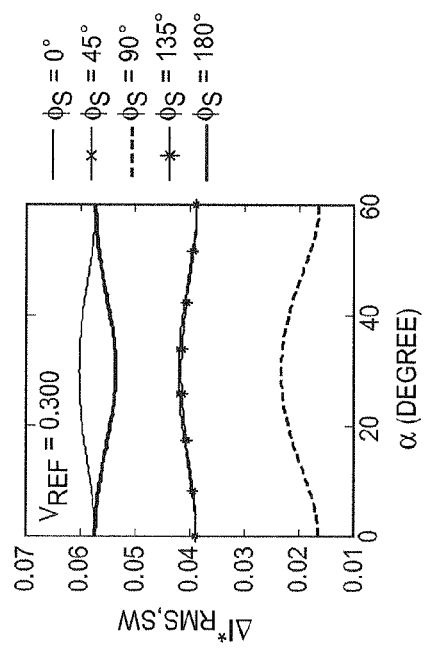
Figure 12B:
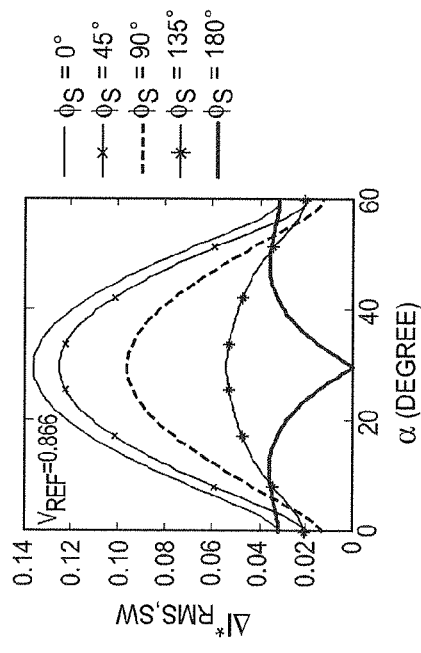
Figure 12D:
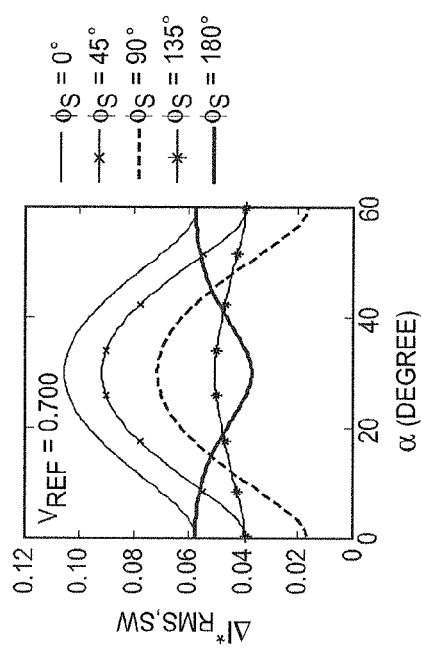

FIGS. 12A through 12D illustrate the variation of $\Delta I^*_{RMS,sw}$ for the two interleaved, parallel connected VSCs 42 and 44 for the SVM switching sequence 0127 with the angle $\alpha$ for different phase shifts ($\phi_s$) and at different reference voltage magnitudes ($V_{REF}$). Specifically, in FIG. 12A, $V_{REF}=0.3$. In FIG. 12B, $V_{REF}=0.5$. In FIG. 12C, $V_{REF}=0.7$. Lastly, in FIG. 12D, $V_{REF}=0.866$. Phase shift $\phi_s=0$ corresponds to the case with no interleaving, which always has the largest current ripple. Of particular interest are $\phi_s=90°$ and $\phi_s=180°$, which represent "standard" phase shifts commonly used by two interleaved VSCs. It is observed from FIGS. 12A through 12D that $\phi_s=90°$ yields the lowest current ripple at low $V_{REF}$ values ($\leq 0.5$) while at high $V_{REF}$ values $\phi_s=180°$ yields the best result. To explain this, FIGS. 13A and 13B illustrate frequency spectrums of the individual converter current for the SVM switching sequence 0127 at $V_{REF}=0.4$ and that at $V_{REF}=0.75$, respectively. At low $V_{REF}$, the harmonics at sidebands of $2n-1)\cdot(f_{SW}=1/T_{SW}$, $n=1, 2, 3, \ldots$) dominate while at high $V_{REF}$, the harmonics at sidebands of $(2n-1)\cdot f_{SW}$ dominate. Further, using a phase shift of 180° mitigates harmonics at the sidebands of $(2n-1)\cdot f_{SW}$ while using a phase shift of 90° mitigates harmonics at the sidebands of $2n\cdot f_{SW}$. The harmonic at the frequency $h\cdot f_{SW}$ in the individual currents, $i_{h,1}$ and $i_{h,2}$, and that in the total current, $i_h$, can be expressed as:

$$i_{h,1} = I_{h,m} \cos(h \cdot 2\pi f_{SW} t)$$

$$i_{h,2} = I_{h,m} \cos[h(2\pi f_{SW} t - \phi_S)] = I_{h,m} \cos(h \cdot 2\pi f_{SW} t - h\phi_S)$$

$$i_h = i_{h,1} + i_{h,2} \qquad \text{Eqn. (8)}$$

where $I_{h,m}$ is the magnitude of the harmonic. Evidently, $i_h=0$ when $h=1, 3, 5, \ldots$ and $\phi_S=180°$, or when $h=2, 6, 10, \ldots$ and $\phi_S=90°$.

One may notice from FIGS. 12A through 12D that sometimes (e.g., at $V_{REF}=0.7$) a "non-standard" phase shift (e.g., $\phi_S=135°$) gives the overall lowest current ripple. This is because at this condition, this phase shift gives the best compromise in reducing the harmonics near $f_{SW}$ and those near $2\cdot f_{SW}$. However, "non-standard" phase shifts will not be further discussed since: (a) their performance is not significantly better than the "standard" phase shifts; and (b) in deriving the optimal scheme discussed below, a hybrid scheme that uses either $\phi_S=180°$ or $\phi_S=90°$ gives lower ripple at most ($V_{REF}$, $\alpha$) values. Analysis of the other six SVM switching sequences show that this conclusion holds true for those SVM switching sequences as well.

As with the single-converter case, the RMS current ripple for the two interleaved, parallel connected VSCs 42 and 44 over a switching cycle depends strongly on the SVM switching sequence employed. FIGS. 14A and 14B illustrate the variation of $\Delta I^*_{RMS,sw}$ for sequences 0127, 0121, 1012 and 012 with the angle $\alpha$ at a constant $V_{REF}$ of 0.74 for $\phi_S=180°$ and $\phi_S=90°$, respectively. $\Delta I^*_{RMS,sw}$ for sequences 7212, 2721 and 721 are not shown since they are symmetric about $\alpha=30°$ to those of sequences 0121, 1012 and 012, respectively. FIGS. 14A and 14B give some general indications about the regions of $\alpha$ of superior performance of different SVM switching sequences at $V_{REF}=0.74$. Specifically, FIG. 14A illustrates RMS current ripple for different SVM switching sequences for different $\alpha$ values for $\phi_S=180°$. FIG. 14B illustrates RMS current ripple for different SVM switching sequences for different $\alpha$ values for $\phi=90°$. A more systematic method for selecting the best sequence for a given $V_{REF}$ and $\alpha$ and designing the hybrid SVM control scheme is discussed below.

Based on the discussion above, the hybrid SVM control scheme for the two interleaved, parallel connected VSCs 42 and 44 is provided such that an optimal SVM switching sequence and optimal phase shift ($\phi_s$) to be employed for a given switching cycle are selected based on at least the angle ($\alpha$) of the revolving reference voltage vector ($\bar{v}_{REF}$) and, in some embodiments, both the reference voltage magnitude ($\bar{v}_{REF}$) and angle ($\alpha$) of the revolving reference voltage vector ($\bar{v}_{REF}$).

FIG. 15 is a zone plot for sector I of the space vector plane created by the six active space vectors illustrated in FIG. 2 for the two interleaved, parallel connected VSCs 42 and 44. Note that zone plots for the other sectors II-VI are the same as that of FIG. 15 but with different SVM sequences as will be appreciated by one of ordinary skill in the art upon reading this disclosure. The zone plot of FIG. 15 considers each combination of the seven SVM switching sequences (i.e., the SVM switching sequences of FIGS. 3A through 3C and FIGS. 4A through 4D) and the two standard phase shifts (i.e., 180° and 90°) for a total of 14 SVM switching sequence and phase shift combinations. The zone plot divides sector I into a number of zones (i.e., optimal zones) each having a corresponding optimal SVM switching sequence and phase shift combination that yields the smallest RMS current ripple in that zone. The clamped SVM switching sequences, i.e., 012 and 721, are assumed to use the same switching frequency as other SVM switching sequences. For a given $V_{REF}$ value, the optimal hybrid scheme would preferably use all the SVM switching sequences crossed by the arc corresponding to that $V_{REF}$ value. The hybrid SVM control scheme that employs SVM switching sequences strictly according to the zone division plot is referred to herein as the optimal hybrid SVM control scheme. Minimum THD can be achieved for any $V_{REF}$ value if the optimal hybrid SVM control scheme is employed. However, the optimal SVM control scheme is difficult to implement in hardware since it involves phase-shift changing in addition to SVM switching sequence changing at many places during a fundamental cycle. As a practical matter, changing phase-shift from 90° to 180° requires an extra $T_{SW}/4$-duration cycle with balanced error voltage-second to be inserted to the SVM of the VSC 44. Due to the difficulty of implementing the optimal SVM control scheme, SVM control scheme is primarily used herein as a benchmark for comparison with the individual sequences and quasi-optimal hybrid SVM control schemes, as discussed below.

FIG. 16 graphically compares the performance of the optimal hybrid SVM control scheme with that of the individual SVM switching sequence and phase shift combinations for the two interleaved, parallel connected VSCs 42 and 44. Specifically, FIG. 16 illustrates the total RMS current ripple over a fundamental cycle (calculated using Equation (6)), for varying $V_{REF}$, for all the individual SVM switching sequences (interleaved by the two different phase shifts) as well as the optimal hybrid SVM control scheme. Notably, SVM switching sequences 7212, 2721, and 721 are not shown since their results are the same as sequences 0121, 1012, and 012, respectively. As expected, the optimal hybrid SVM control scheme has the smallest current ripple at any $V_{REF}$ value. Sequence 0127 with 90° phase shift has almost the same performance as the optimal hybrid SVM control scheme at low $V_{REF}$ values (<0.32). For $0.32<V_{REF}<0.54$, the SVM switching sequence 0121 with 180° phase shift is close to optimal. Thus, for low $V_{REF}$ values (<0.54), the optimal hybrid SVM control scheme can be approximated by the individual sequences 0127 or sequence 0121 (or a hybrid of 0121 and 7212). However, for high $V_{REF}$ values (>0.54), which corresponds to most grid-connected applications, there is significant difference between the optimal hybrid SVM control scheme and any individual scheme. This suggests that, as far as reducing the total current THD is concerned, a hybrid sequence scheme will benefit grid-connected applications.

FIG. 17 illustrates a quasi-optimal hybrid SVM control scheme for the two interleaved, parallel connected VSCs 42 and 44 according to one embodiment of the present disclosure. Referring back to FIG. 15, many applications, such as for example as grid-connected applications, have reference voltage magnitudes ($V_{REF}$) that primarily occupy zones D and E of the zone division plot. As such, in this embodiment, the quasi-optimal hybrid SVM control scheme employs, for sector I, SVM switching sequence 2721 with $\phi_s=180°$ for $0°<\alpha<30°$ and SVM sequence 1012 with $\phi_s=180°$ for $30°<\alpha<60°$, as illustrated in FIG. 17. In other words, the quasi-optimal hybrid SVM control scheme divides sector I into two quasi-optimal zones, namely, a first quasi-optimal zone for $0°<\alpha<30°$ having a corresponding optimal SVM switching sequence of 2721 (with $\phi_s=180°$) and a second quasi-optimal zone for $30°<\alpha<60°$ having a corresponding optimal SVM switching sequence of 1012 (with $\phi_s=180°$).

Similarly, for sector II, the quasi-optimal hybrid SVM control scheme employs SVM switching sequence 3032 with $\phi_s=180°$ for $60°<\alpha<90°$ and SVM sequence 2723 with $\phi_s=180°$ for $90°<\alpha<120°$. For sector III, the quasi-optimal hybrid SVM control scheme employs SVM switching sequence 4743 with $\phi_s=180°$ for $120°<\alpha<150°$ and SVM sequence 3034 with $\phi_s=180°$ for $150°<\alpha<180°$. For sector IV, the quasi-optimal hybrid SVM control scheme employs SVM switching sequence 5054 with $\phi_s=180°$ for $180°<\alpha<210°$ and SVM sequence 4745 with $\phi_s=180°$ for $210°<\alpha<240°$. For sector V, the quasi-optimal hybrid SVM control scheme employs SVM switching sequence 6765 with $\phi_s=180°$ for $240°<\alpha<270°$ and SVM sequence 5056 with $\phi_s=180°$ for $270°<\alpha<300°$. Lastly, for sector VI, the quasi-optimal hybrid SVM control scheme employs SVM switching sequence 1016 with $\phi_s=180°$ for $300°<\alpha<330°$ and SVM sequence 6761 with $\phi_s=180°$ for $330°<\alpha<360°$.

Notably, the quasi-optimal hybrid SVM control scheme of FIG. 17 is exemplary. Using the zone plot of FIG. 15, different quasi-optimal hybrid SVM control schemes may be created for the two-converter embodiment. For example, while the quasi-optimal control scheme of FIG. 17 utilizes only two quasi-optimal zones, in another embodiment, the quasi-optimal SVM control scheme may use more than two quasi-optimal zones defined by a combination of $V_{REF}$ and $\alpha$. In addition, while in this embodiment the SVM sequences and quasi-optimal zones are selected to minimize or at least substantially reduce THD, in another embodiment, the SVM sequences and quasi-optimal zones may be selected to provide a desirable effect on some other characteristic of the modular three-phase converter 36 (e.g., minimize or reduce switching losses).

FIG. 18 compares the total RMS current ripple over a fundamental cycle for the quasi-optimal hybrid SVM control scheme of FIG. 17 with that of the optimal hybrid SVM control scheme represented by the zone division plot of FIG. 15 and the conventional SVM switching sequence 0127 (with $\phi_s=180°$) for varying $V_{REF}$. As illustrated, the quasi-optimal hybrid SVM control scheme yields a THD that is close to that of the optimal hybrid SVM control scheme and is significantly lower than the THD when using the conventional SVM switching sequence 0127 for the $V_{REF}$ range corresponding to grid-connected applications (i.e., $V_{REF}>0.54$). In the best case, at $V_{REF}=0.56$ (corresponding to a modulation index of $m_a=0.65$), the quasi-optimal hybrid SVM control scheme has a THD 67% lower than that of the conventional SVM switching sequence 0127. In a normal case, say, at $V_{REF}=0.74$ (corresponding to a modulation index of $m_a=0.85$), the quasi-optimal hybrid SVM control scheme has a THD 46% lower than that of the conventional SVM switching sequence 0127.

FIGS. 19 through 23 discuss a hybrid SVM control scheme for an embodiment where the modular three-phase converter 36 of FIG. 7 includes three interleaved, parallel connected VSCs 98, 100, and 102. More specifically, FIG. 19 illustrates one embodiment of the modular three-phase converter 36 of FIG. 7 where the modular three-phase converter 36 includes the three interleaved, parallel connected VSCs 98, 100, and 102. As illustrated, the VSC 98 includes an a-leg formed by switches 104 and 106 and diodes 108 and 110 connected as shown, a b-leg formed by switches 112 and 114 and diodes 116 and 118 connected as shown, and a c-leg formed by switches 120 and 122 and diodes 124 and 126 connected as shown. The switches 104, 106, 112, 114, 120, and 122 may be implemented as, for example, IGBTs, but are not limited thereto. The switches 104, 112, and 120 are controlled by switch control signals $S_{a1}$, $S_{b1}$, and $S_{c1}$, respectively. Conversely, the switches 106, 114, and 122 are controlled by inverses of the switch control signals $S_{a1}$, $S_{b1}$, and $S_{c1}$, which are designated as switch control signals $\overline{S}_{a1}$, $\overline{S}_{b1}$, and $\overline{S}_{c1}$. As such, at no time are two switches in the same leg on.

Similarly, as illustrated, the VSC 100 includes an a-leg formed by switches 128 and 130 and diodes 132 and 134 connected as shown, a b-leg formed by switches 136 and 138 and diodes 140 and 142 connected as shown, and a c-leg formed by switches 144 and 146 and diodes 148 and 150 connected as shown. The switches 128, 130, 136, 138, 144, and 146 may be implemented as, for example, IGBTs, but are not limited thereto. The switches 128, 136, and 144 are controlled by switch control signals $S_{a2}$, $S_{b2}$, and $S_{c2}$, respectively. Conversely, the switches 130, 138, and 146 are controlled by inverses of the switch control signals $S_{a2}$, $S_{b2}$, and $S_{c2}$, which are designated as switch control signals $\overline{S}_{a2}$, $\overline{S}_{b2}$, and $\overline{S}_{c2}$. As such, at no time are two switches in the same leg on. Notably, the switch control signals $S_{a2}$, $S_{b2}$, and $S_{c2}$ are the same as the switch control signals $S_{a1}$, $S_{b1}$, and $S_{c1}$ but phase shifted by phase $\phi_s$.

Lastly, as illustrated, the VSC 102 includes an a-leg formed by switches 152 and 154 and diodes 156 and 158 connected as shown, a b-leg formed by switches 160 and 162 and diodes 164 and 166 connected as shown, and a c-leg formed by switches 168 and 170 and diodes 172 and 174 connected as shown. The switches 152, 154, 160, 162, 168, and 170 may be implemented as, for example, IGBTs, but are not limited thereto. The switches 152, 160, and 168 are controlled by switch control signals $S_{a3}$, $S_{b3}$, and $S_{c3}$, respectively. Conversely, the switches 154, 162, and 170 are controlled by inverses of the switch control signals $S_{a3}$, $S_{b3}$, and $S_{c3}$, which are designated as switch control signals $\overline{S}_{a3}$, $\overline{S}_{b3}$, and $\overline{S}_{c3}$. As such, at no time are two switches in the same leg on. Notably, the switch control signals $S_{a3}$, $S_{b3}$, and $S_{c3}$ are the same as the switch control signals $S_{a2}$, $S_{b2}$, and $S_{c2}$ (which themselves are the same as the switch control signals $S_{a1}$, $S_{b1}$, and $S_{c1}$) but phase shifted by phase $\phi_s$ with respect to the switch control signals $S_{a2}$, $S_{b2}$, and $S_{c2}$ (and thus phase shifted by phase $2 \cdot \phi_s$ with respect to the switch control signals $S_{a1}$, $S_{b1}$, and $S_{c1}$).

Outputs of the VSCs 98, 100, and 102 are coupled via inductors (L) as illustrated to provide AC voltages $v_{ga}$, $V_{gb}$, and $v_{gc}$. The AC voltages $v_{ga}$, $V_{gb}$, and $v_{gc}$ are at the fundamental line frequency (e.g., 60 Hz) and may represent the voltage of a power system grid 176 or the voltage across a load 178 (e.g., a large filter capacitor) with negligible voltage ripple.

The three VSCs 98, 100, and 102 use the same sampled revolving reference voltage vector ($\overline{v}_{REF}$) as well as the same SVM switching sequence (e.g., the 0127 SVM switching sequence), but the switching of the VSC 100 lags that of the VSC 98 by a certain phase angle ($\phi_s$) and the switching of the VSC 102 lags that of the VSC 98 by $2 \cdot \phi_s$. Consequently, the stator flux ripple vector ($\Psi$), and its q-axis and d-axis components, of the VSC 100 also lags those of the VSC 98 by $\phi_s$, and the stator flux ripple vector ($\Psi$), and its q-axis and d-axis components, of the VSC 102 also lags those of the VSC 98 by $2 \cdot \phi_s$. Applying superposition, the ripple of the total current corresponds to the sum of the three stator flux ripple vectors.

FIGS. 20A through 20D illustrate the variation of $\Delta I^*_{RMS,sw}$ for the conventional SVM switching sequence 0127 with the angle $\alpha$ for different phase shifts and at different reference voltage magnitudes for the three converter embodiment of FIG. 19. The results of using "standard" phase shifts, e.g. 120°/240° for the three-converter embodiment, are plotted with thick lines. The "non-standard" phase shifts are chosen to evenly cover the possible phase shift combinations. It is evident from FIGS. 20A through 20D that using $\phi_s$=120° and $2 \cdot \phi_s$=240° yields the lowest current ripple for all $V_{REF}$ values for the three-converter embodiment. This can be explained with an analysis similar to Equation (8). Basically, $\phi_s$=120° and $2 \cdot \phi_s$=240° eliminates harmonics at $h \cdot f_{SW}$ (h=1, 2, 4, 5, 7, 8, ...), while $\phi_s$=60° and $2 \cdot \phi_s$=120° eliminates harmonics at $h \cdot f_{SW}$ (h=2, 4, 8, 10, 14, 16, ...). Apparently, using $\phi_s$=60 and $2 \cdot \phi_s$=120 has no advantage over using $\phi_s$=120° and $2 \cdot \phi_s$=240° in any case. One may choose to use $\phi_s$=40° and $2 \cdot_s$=80° to eliminate the harmonic at $3 \cdot f_{SW}$, which is not canceled by using $\phi_s$=120° and $2 \cdot \phi_s$=240°, but the total THD is worse as compared to $\phi_s$=60° and $2 \cdot \phi_s$=120° since neither of the major harmonics, i.e. the ones at $f_{SW}$ and at $2 \cdot f_{SW}$, is eliminated. As with the two-converter embodiment, the results in FIGS. 20A through 20D show that using standard phase shifts is sufficient to give current ripple performance close to optimal for the three-converter embodiment. Analysis of the other six SVM switching sequences show that this conclusion holds true for those sequences as well.

FIG. 21 is a zone division plot for the three-converter embodiment. As discussed above, only one set of phase shifts, i.e. $\phi_s$=120° and $2 \cdot \phi_s$=240°, is used for the hybrid SVM control scheme for the three-converter embodiment. Therefore, only the seven SVM switching sequences (with $\phi_s$=120° and $2 \cdot \phi_s$=240°) were considered. In one embodiment, the hybrid SVM control scheme is an optimal hybrid SVM control scheme that utilizes all of the zones and their corresponding optimal SVM switching sequences shown in the zone division plot of FIG. 21. However, in the preferred embodiment, the zone division plot is utilized to provide a quasi-optimal hybrid SVM control scheme for the three-converter embodiment. Looking at FIG. 21, of particular interest is that the SVM switching sequences 012 and 721, which are more specifically clamped sequences, occupy significant areas for a $V_{REF}$ range of 0.5 to 0.7. In one embodiment, these clamped sequences are utilized in the quasi-optimal hybrid SVM control scheme for the three-converter embodiment since the clamped sequences have only two switching transitions in each subcycle, instead of three for the other sequences, and thus may reduce switching losses.

FIG. 22 compares the total RMS current ripple over a fundamental cycle for varying $V_{REF}$, for two simplified hybrid SVM control schemes, the optimal hybrid SVM control scheme, and the conventional 0127 SVM switching sequence. The two simplified hybrid schemes are: (a) 012/721, which employs 012 for 0<a<30° and 721 for 30°<a<60°; and (b) 721/012, which employs 721 for 0<a<30° and 012 for 30°<a<60°. Based on this comparison, the preferred quasi-optimal hybrid SVM control scheme for the three-converter embodiment employs, for sector I: (a) 012/721 for 0<$V_{REF}$<0.3 (or use 0127 if lower THD is required); (b) employs 721/012 for 0.3<$V_{REF}$<0.6; and (c) employs 012/721 for $V_{REF}$>0.6. This preferred quasi-optimal hybrid SVM control scheme yields good performance for both ripple and switching loss reduction.

Based on the results of FIG. 22, FIG. 23 illustrates the quasi-optimal hybrid SVM control scheme for the three-converter embodiment according to one embodiment of the present disclosure. In this embodiment, each sector is divided into six quasi-optimal zones each having a corresponding optimal SVM switching sequence. Using sector I as an example, sector I is divided into six quasi-optimal zones, namely:
1. 0°<α<30° and 0<$V_{REF}$<0.3 having optimal SVM switching sequence 012 (with $\phi_s$=120° and $2 \cdot \phi_s$=240°),
2. 0°<α<30° and 0.3<$V_{REF}$<0.6 having optimal SVM switching sequence 721 (with $\phi_s$=120° and $2 \cdot \phi_s$=240°), 3. $0°<\alpha<30°$ and $V_{REF}>0.6$ having optimal SVM switching sequence 012 (with $\phi_S=120°$ and $2\cdot\phi_S=240°$),
4. $30°<\alpha<60°$ and $0<V_{REF}<0.3$ having optimal SVM switching sequence 721 (with $\phi_S=120°$ and $2\cdot\phi_S=240°$),
5. $30°<\alpha<60°$ and $0.3<V_{REF}<0.6$ having optimal SVM switching sequence 012 (with $\phi_S=120°$ and $2\cdot\phi_S=240°$), and
6. $30°<\alpha<60°$ and $V_{REF}>0.6$ having optimal SVM switching sequence 721 (with $\phi_S=120°$ and $2\cdot\phi_S=240°$).

In a similar manner, each of the other sectors (i.e., sectors II through VI) is divided into six quasi-optimal zones having corresponding optimal SVM switching sequences (with $\phi_S=120°$ and $2\cdot\phi_S=240°$), as illustrated in FIG. 23.

Notably, the quasi-optimal hybrid SVM control scheme of FIG. 23 is exemplary. Using the zone plot of FIG. 21, different quasi-optimal hybrid SVM control schemes may be created for the three-converter embodiment. For example, while the quasi-optimal control scheme of FIG. 23 utilizes six quasi-optimal zones for each sector, in another embodiment, the quasi-optimal SVM control scheme may use more or less than six quasi-optimal zones per sector. In addition, while in this embodiment the SVM sequences and quasi-optimal zones are selected to minimize or at least substantially reduce THD, in another embodiment, the SVM sequences and quasi-optimal zones may be selected to provide a desirable effect on some other characteristic of the modular three-phase converter 36 (e.g., minimize or reduce switching losses).

FIGS. 24 through 27 discuss a hybrid SVM control scheme for an embodiment where the modular three-phase converter 36 of FIG. 7 includes four interleaved, parallel connected VSCs 180, 182, 184, and 186. More specifically, FIG. 24 illustrates one embodiment of the modular three-phase converter 36 of FIG. 7 where the modular three-phase converter 36 includes the four interleaved, parallel connected VSCs 180, 182, 184, and 186. As illustrated, the VSC 180 includes an a-leg formed by switches 188 and 190 and diodes 192 and 194 connected as shown, a b-leg formed by switches 196 and 198 and diodes 200 and 202 connected as shown, and a c-leg formed by switches 204 and 206 and diodes 208 and 210 connected as shown. The switches 188, 190, 196, 198, 204, and 206 may be implemented as, for example, IGBTs, but are not limited thereto. The switches 188, 196, and 204 are controlled by switch control signals $S_{a1}$, $S_{b1}$, and $S_{c1}$, respectively. Conversely, the switches 190, 198, and 206 are controlled by inverses of the switch control signals $S_{a1}$, $S_{b1}$, and $S_{c1}$, which are designated as switch control signals $\overline{S}_{a1}$, $\overline{S}_{b1}$, and $\overline{S}_{c1}$. As such, at no time are two switches in the same leg on.

Similarly, as illustrated, the VSC 182 includes an a-leg formed by switches 212 and 214 and diodes 216 and 218 connected as shown, a b-leg formed by switches 220 and 222 and diodes 224 and 226 connected as shown, and a c-leg formed by switches 228 and 230 and diodes 232 and 234 connected as shown. The switches 212, 214, 220, 222, 228, and 230 may be implemented as, for example, IGBTs, but are not limited thereto. The switches 212, 220, and 228 are controlled by switch control signals $S_{a2}$, $S_{b2}$, and $S_{c2}$, respectively. Conversely, the switches 214, 222, and 230 are controlled by inverses of the switch control signals $S_{a2}$, $S_{b2}$, and $S_{c2}$, which are designated as switch control signals $\overline{S}_{a2}$, $\overline{S}_{b2}$, and $\overline{S}_{c2}$. As such, at no time are two switches in the same leg on. Notably, the switch control signals $S_{a2}$, $S_{b2}$, and $S_{c2}$ are the same as the switch control signals $S_{a1}$, $S_{b1}$, and $S_{c1}$ but phase shifted by phase $\phi_s$.

The VSC 184 includes an a-leg formed by switches 236 and 238 and diodes 240 and 242 connected as shown, a b-leg formed by switches 244 and 246 and diodes 248 and 250 connected as shown, and a c-leg formed by switches 252 and 254 and diodes 256 and 258 connected as shown. The switches 236, 238, 244, 246, 252, and 254 may be implemented as, for example, IGBTs, but are not limited thereto. The switches 236, 244, and 252 are controlled by switch control signals $S_{a3}$, $S_{b3}$, and $S_{c3}$, respectively. Conversely, the switches 238, 246, and 254 are controlled by inverses of the switch control signals $S_{a3}$, $S_{b3}$, and $S_{c3}$, which are designated as switch control signals $\overline{S}_{a3}$, $\overline{S}_{b3}$, and $\overline{S}_{c3}$. As such, at no time are two switches in the same leg on. Notably, the switch control signals $S_{a3}$, $S_{b3}$, and $S_{c3}$ are the same as the switch control signals $S_{a2}$, $S_{b2}$, and $S_{c2}$ (which themselves are the same as the switch control signals $S_{a1}$, $S_{b1}$, and $S_{c1}$) but phase shifted by phase $\phi_s$ with respect to the switch control signals $S_{a2}$, $S_{b2}$, and $S_{c2}$ (and thus phase shifted by phase $2\cdot\phi_s$ with respect to the switch control signals $S_{a1}$, $S_{b1}$, and $S_{c1}$).

Lastly, the VSC 186 includes an a-leg formed by switches 260 and 262 and diodes 264 and 266 connected as shown, a b-leg formed by switches 268 and 270 and diodes 272 and 274 connected as shown, and a c-leg formed by switches 276 and 278 and diodes 280 and 282 connected as shown. The switches 260, 262, 268, 270, 276, and 278 may be implemented as, for example, IGBTs, but are not limited thereto. The switches 260, 268, and 276 are controlled by switch control signals $S_{a4}$, $S_{b4}$, and $S_{c4}$, respectively. Conversely, the switches 262, 270, and 278 are controlled by inverses of the switch control signals $S_{a4}$, $S_{b4}$, and $S_{c4}$, which are designated as switch control signals $\overline{S}_{a4}$, $\overline{S}_{b4}$, and $\overline{S}_{c4}$. As such, at no time are two switches in the same leg on. Notably, the switch control signals $S_{a4}$, $S_{b4}$, and $S_{c4}$ are the same as the switch control signals $S_{a3}$, $S_{b3}$, and $S_{c3}$ (which themselves are the same as the switch control signals $S_{a1}$, $S_{b1}$, and $S_{c1}$ and the switch control signals $S_{a2}$, $S_{b2}$, and $S_{c2}$) but phase shifted by phase $\phi_s$ with respect to the switch control signals $S_{a3}$, $S_{b3}$, and $S_{c3}$ (and thus phase shifted by phase $3\cdot\phi_s$ with respect to the switch control signals $S_{a1}$, $S_{b1}$, and $S_{c1}$).

Outputs of the VSCs 180, 182, 184, and 186 are coupled via inductors (L) as illustrated to provide AC voltages $v_{ga}$, $V_{gb}$, and $v_{gc}$. The AC voltages $v_{ga}$, $V_{gb}$, and $v_{gc}$ are at the fundamental line frequency (e.g., 60 Hz) and may represent the voltage of a power system grid 284 or the voltage across a load 286 (e.g., a large filter capacitor) with negligible voltage ripple.

The four VSCs 180, 182, 184, and 186 use the same sampled revolving reference voltage vector ($\overline{v}_{REF}$) as well as the same SVM switching sequence (e.g., the 0127 SVM switching sequence), but the switching of the VSC 182 lags that of the VSC 180 by a certain phase angle ($\phi_s$), the switching of the VSC 184 lags that of the VSC 180 by $2\cdot\phi_s$, and the switching of the VSC 186 lags that of the VSC 180 by $3\cdot\phi_s$. Consequently, the stator flux ripple vector ($\overline{\Psi}$), and its q-axis and d-axis components, of the VSC 182 also lags those of the VSC 180 by $\phi_s$, the stator flux ripple vector ($\overline{\Psi}$), and its q-axis and d-axis components, of the VSC 184 also lags those of the VSC 180 by $2\cdot\phi_s$, and the stator flux ripple vector ($\overline{\Psi}$), and its q-axis and d-axis components, of the VSC 186 also lags those of the VSC 180 by $3\cdot\phi_s$. Applying superposition, the ripple of the total current corresponds to the sum of the four stator flux ripple vectors.

FIGS. 25A through 25D illustrate the variation of $\Delta I^*_{RMS,sw}$ for sequence 0127 with the angle $\alpha$ for different phase shifts and at different reference voltage magnitudes for the four converter embodiment of FIG. 24. The results of using "standard" phase shifts, e.g. $\phi_S=90°$, $2\cdot\phi_S=180°$, $3\cdot\phi_S=270°$ for the four-converter case, are plotted with thick lines. The "non-standard" phase shifts are chosen to evenly cover the possible phase shift combinations. From FIGS. 25A through 25D, it can be seen that using $\phi_S=90°$, $2\cdot\phi_S=180°$, and $3\cdot\phi_S=270°$ (which can be denoted as $\phi_S=90°/180°/270°$) is nearly optimal for the four-converter embodiment except at very low $V_{REF}$ values, where $\phi_S=45°/90°/135°$ is more preferred. This is because $\phi_S=90°/180°/270°$ eliminates harmonics at $h\cdot f_{SW}$, (h=1, 2, 3, 5, 6, 7, 9, ...) while $\phi_S=45°/90°/135°$ eliminates harmonics at $h\cdot f_{SW}$, (h=2, 4, 6, 10, 14, 16, ...), and at very low $V_{REF}$, the harmonic at $4\cdot f_{SW}$ may be even higher than the harmonics at $f_{SW}$. As with the two-converter embodiment, the results in FIGS. 25A through 25D show that using standard phase shifts is sufficient to give current ripple performance close to optimal for the four-converter embodiment. Analysis of the other six SVM switching sequences shows that this conclusion holds true for those sequences as well.

FIG. 26 is a zone division plot that illustrates optimal zones for the possible SVM switching sequences for the four-converter embodiment. As seen, zones corresponding to the SVM switching sequences are more scattered than in either the two-converter or the three-converter embodiment. Hence, deriving a quasi-optimal hybrid SVM control scheme is more challenging. In order to develop the quasi-optimal hybrid SVM control scheme for the four-converter embodiment, performances of a number of simplified hybrid schemes, each of which employs one of the three SVM switching sequence pairs (i.e., 0121/7212, 1012/2721, and 012/721) the way as described above for 012/721, along with that of sequence 0127 with $\phi_S=45°/90°/135°$, are compared to that of the optimal scheme, as shown in FIG. 27. From FIG. 27, it can be seen that the quasi-optimal hybrid SVM control scheme for the four-converter embodiment optimally combines two or more of the simplified SVM switching schemes according to $V_{REF}$ range in order to yield THD performance very close to the optimal scheme. However, since, as seen from FIG. 27, the 012/721 and 721/012 schemes have reasonably good THD performance, one may choose to use these schemes to achieve better tradeoff between reducing THD and switching loss.

FIG. 28 illustrates a modular three-phase converter 36' that is controlled by a SVM controller 38' according to a hybrid SVM control scheme according to another embodiment of the present disclosure. This embodiment is substantially the same as that of FIG. 7. However, in this embodiment, the number of VSCs in the modular three-phase converter 36' is configurable or dynamic whereas the number of VSCs in the modular three-phase converter 36 of FIG. 7 is static. For example, the modular three-phase converter 36' includes a number of VSCs that can be activated or deactivated as desired. Thus, the modular three-phase converter 36' may include N VSCs that can be activated/deactivated as desired to provide a desired number of interleaved, parallel connected VSC converters. In this example, the number of VSCs is configured by a controller 40', but the present disclosure is not limited thereto. Based on the number of active VSCs in the modular three-phase converter 36', the SVM controller 38' utilizes the corresponding optimal or quasi-optimal hybrid SVM control scheme.

For example, if two VSCs are active, the SVM controller 38' preferably utilizes the quasi-optimal hybrid VSC control scheme for the two-converter embodiment described above. Similarly, if three VSCs are active, the SVM controller 38' preferably utilizes the quasi-optimal hybrid VSC control scheme for the three-converter embodiment desired above.

The performance of one exemplary implementation of the two-converter embodiment of FIG. 9 will now be described. However, the following discussion is only for this exemplary implementation and is not intended to limit the scope of the present disclosure. In this exemplary implementation, the circuit layout of FIG. 9 was utilized with the three-phase resistive load and capacitor filter. Sufficiently large AC capacitance, $C_{AC}$, is used so that the ripple of the voltage across the AC capacitor is small and can be neglected. The AC filter parameters are L=300 µH and $C_{AC}$=6.8 µF (delta connection). For this exemplary implementation, an open-loop control is sufficient. A 16-bit fixed-point TMS320F2808 DSP platform with 12 PWM outputs was used to implement the conventional and quasi-optimal hybrid SVM control schemes. Table I below shows the specifications of the exemplary implementation, where $m_a$ denotes the modulation index, with a range of 0 to 1 corresponding to a normalized $V_{REF}$ range of 0 to 0.866.

TABLE I

| | |
|---|---|
| Max Power (W) | 1500 |
| DC link Voltage (V) | 170 |
| Maximum ac voltage (L-L, RMS, V) | 115 |
| maximum $m_a$ | 0.957 |
| Nominal ac voltage (L-L, RMS, V) | 102 |
| Nominal $m_a$ | 0.85 |
| Nominal current (RMS, A) | 6.6 |

Experimental results utilizing this exemplary implementation have shown that the quasi-optimal hybrid SVM control scheme results in significantly smaller ripple in the total inductor current. This results in significantly smaller RMS current in the AC capacitor filter for the quasi-optimal hybrid SVM control scheme.

Tests utilizing the exemplary implementation have been carried out to compare the performance of the conventional SVM control scheme and the quasi-optimal hybrid SVM control scheme. Table II below summarizes the results for operating conditions at nominal output current but different line voltages, and Table III below summarizes the results for operating conditions at nominal line voltage but different output currents. In addition to the THDs of the individual and total inductor current, the THD of the line-to-line AC voltage, the overall efficiency of the inverter, the RMS current flowing in the AC capacitor filter, and the RMS current flowing in the DC capacitor filter on the DC link are also compared between the two schemes.

TABLE II

| Line-line RMS voltage (V) | 115.0 | | 102.2 | | 94.5 | | 78.1 | |
|---|---|---|---|---|---|---|---|---|
| $m_a$ | 0.957 | | 0.850 | | 0.786 | | 0.650 | |
| Load RMS Current (A) | 6.64 | | 6.64 | | 6.64 | | 6.64 | |
| SVPWM scheme | 0127 | 2721/1012 | 0127 | 2721/1012 | 0127 | 2721/1012 | 0127 | 2721/1012 |
| THD of $I_{A1}$ | 15.8% | 17.2% | 14.3% | 17.8% | 14.1% | 18.5% | 13.6% | 19.6% |
| THD of total current $I_A$ | 7.46% | 6.28% | 8.14% | 4.62% | 9.28% | 4.52% | 11.0% | 4.08% |
| THD of line-line voltage | 2.02% | 2.10% | 2.14% | 2.21% | 2.35% | 2.43% | 2.75% | 2.88% |
| Efficiency | 0.945 | 0.945 | 0.932 | 0.935 | 0.930 | 0.928 | 0.918 | 0.913 |
| $I_{rms}$ of AC cap (A) | 0.744 | 0.722 | 0.733 | 0.596 | 0.764 | 0.555 | 0.814 | 0.498 |
| $I_{rms}$ of DC cap (A) | 1.39 | 1.42 | 1.73 | 1.77 | 1.92 | 1.96 | 2.17 | 2.22 |

TABLE III

| Line-line RMS voltage (V) | 102.2 | | 102.2 | | 102.2 | | 102.2 | |
|---|---|---|---|---|---|---|---|---|
| $m_a$ | 0.850 | | 0.850 | | 0.850 | | 0.850 | |
| Load RMS Current (A) | 6.64 | | 2.95 | | 1.47 | | 0.59 | |
| SVPWM scheme | 0127 | 2721/1012 | 0127 | 2721/1012 | 0127 | 2721/1012 | 0127 | 2721/1012 |
| THD of $I_{A1}$ | 14.3% | 17.8% | 29.6% | 35.5% | 53.2% | 64.8% | 107% | 130% |
| THD of total current $I_A$ | 8.14% | 4.62% | 16.0% | 9.25% | 28.4% | 15.6% | 57.1% | 31.2% |
| THD of line-line voltage | 2.14% | 2.21% | 2.12% | 2.24% | 2.12% | 2.26% | 2.12% | 2.21% |
| Efficiency | 0.932 | 0.935 | 0.910 | 0.909 | 0.865 | 0.861 | 0.745 | 0.738 |
| $I_{rms}$ of AC cap (A) | 0.733 | 0.596 | 0.651 | 0.537 | 0.643 | 0.528 | 0.633 | 0.521 |
| $I_{rms}$ of DC cap (A) | 1.73 | 1.77 | 0.786 | 0.891 | 0.475 | 0.596 | 0.337 | 0.476 |

From these results, the following observations can be made. As expected, the quasi-optimal SVM control scheme yields significantly smaller total inductor current THD and RMS current in the AC capacitor filter than the conventional SVM scheme. This reduction in current ripple and AC filter current becomes more significant when $m_a$ gets lower until approximately $m_a$=0.65, where this reduction is maximum at 63%. At the nominal $m_a$, i.e. $m_a$=0.85, the reduction in current THD is 43% and the reduction in AC capacitor RMS current is 18.6%. On the other hand, the quasi-optimal scheme yields larger individual inductor current THD than the conventional scheme. The RMS currents in the DC link capacitor for the two schemes are about the same at the nominal load. However, at light loads, the quasi-optimal scheme gives higher values than the conventional scheme. The quasi-optimal SVM control scheme yields slightly higher THD in the line-to-line voltage. This is due to the fact that, when the current has a large ripple compared to its fundamental component, dead times cause more low-frequency distortion for the quasi-optimal SVM control scheme than for the conventional scheme. However, if current control is employed or dead time compensation is used, this issue should be alleviated. Two schemes yield almost the same overall inverter efficiency. From these observations, the quasi-optimal SVM control scheme discussed above has advantages such as, but not limited to, reduced AC capacitor filter value, current rating and loss, but disadvantages in terms of increased individual inductor current ripple. Conversely, for the same capacitor the inductance value may be reduced. In either case the total size of the output filter is reduced.

Notably, the hybrid SVM control schemes described herein are applicable to all modular three-phase converters (or inverters). Further, the present disclosure is not limited thereto, and some exemplary applications are modular three-phase converters utilized for grid connection of renewable energy sources, motor drives, electric (plug-in) vehicles, or the like.

Those skilled in the art will recognize improvements and modifications to the preferred embodiments of the present disclosure. All such improvements and modifications are considered within the scope of the concepts disclosed herein and the claims that follow.

What is claimed is:

1. A method of controlling a modular three-phase converter that comprises three interleaved, parallel connected Voltage Source Converters (VSCs), comprising:
   obtaining a sample of a revolving reference voltage vector that defines a reference voltage magnitude and angle of the revolving reference voltage vector;
   identifying one of a plurality of quasi-optimal zones in a space vector plane that corresponds to both the reference voltage magnitude and the angle of the revolving reference voltage vector, wherein the plurality of quasi-optimal zones comprises a first quasi-optimal zone defined for $0°<\alpha<30°$ and $0<V_{REF}<0.3$ having a first corresponding optimal Space Vector Pulse Width Modulation (SVM) switching sequence, a second quasi-optimal zone defined for $0°<\alpha<30°$ and $0.3<V_{REF}<0.6$ having a second corresponding optimal SVM switching sequence, a third quasi-optimal zone defined for $0°<\alpha<30°$ and $V_{REF}>0.6$ having a third corresponding optimal SVM switching sequence, a fourth quasi-optimal zone defined for $30°<\alpha<60°$ and $0<V_{REF}<0.3$ having a fourth corresponding optimal SVM switching sequence, a fifth quasi-optimal zone defined for $30°<\alpha<60°$ and $0.3<V_{REF}<0.6$ having a fifth corresponding optimal SVM switching sequence, and a sixth quasi-optimal zone defined for $30°<\alpha<60°$ and $V_{REF}>0.6$ having a sixth corresponding optimal SVM switching sequence, where $V_{REF}$ is the reference voltage magnitude and $\alpha$ is the angle of the revolving reference voltage vector; and
   applying the corresponding optimal SVM switching sequence for the one of the plurality of quasi-optimal zones to the modular three-phase converter.

2. The method of claim 1 wherein the plurality of quasi-optimal zones and the corresponding optimal SVM switching sequences for the plurality of quasi-optimal zones are both optimized to provide a desired characteristic for the modular three-phase converter.

3. The method of claim 1 wherein the plurality of quasi-optimal zones and the corresponding optimal SVM switching sequences for the plurality of quasi-optimal zones are both optimized for low Total Harmonic Distortion (THD) in a total line current of the modular three-phase converter.

4. The method of claim 1 wherein applying the corresponding optimal SVM switching sequence for the one of the plurality of quasi-optimal zones to the modular three-phase converter comprises:
   applying the corresponding optimal SVM switching sequence for the one of the plurality of quasi-optimal zones to a first VSC of the three interleaved, parallel connected VSCs;
   applying the corresponding optimal SVM switching sequence for the one of the plurality of quasi-optimal zones to a second VSC of the three interleaved, parallel connected VSCs with a phase-shift of 120°; and
   applying the corresponding optimal SVM switching sequence for the one of the plurality of quasi-optimal zones to a third VSC of the three interleaved, parallel connected VSCs with a phase-shift of 240°.

5. The method of claim 1 wherein identifying the one of the plurality of quasi-optimal zones that corresponds to both the reference voltage magnitude and the angle of the revolving reference voltage vector comprises:
   identifying the first quasi-optimal zone as the one of the plurality of quasi-optimal zones that corresponds to both the reference voltage magnitude and the angle of the revolving reference voltage vector if the reference voltage magnitude is less than 0.3 and the angle of the revolving reference voltage vector is within a range of 0° to 30°;

identifying the second quasi-optimal zone as the one of the plurality of quasi-optimal zones that corresponds to both the reference voltage magnitude and the angle of the revolving reference voltage vector if the reference voltage magnitude is in a range of 0.3 to 0.6 and the angle of the revolving reference voltage vector is within a range of 0° to 30°;

identifying the third quasi-optimal zone as the one of the plurality of quasi-optimal zones that corresponds to both the reference voltage magnitude and the angle of the revolving reference voltage vector if the reference voltage magnitude is greater than 0.6 and the angle of the revolving reference voltage vector is within a range of 0° to 30°;

identifying the fourth quasi-optimal zone as the one of the plurality of quasi-optimal zones that corresponds to both the reference voltage magnitude and the angle of the revolving reference voltage vector if the reference voltage magnitude is less than 0.3 and the angle of the revolving reference voltage vector is within a range of 30° to 60°;

identifying the fifth quasi-optimal zone as the one of the plurality of quasi-optimal zones that corresponds to both the reference voltage magnitude and the angle of the revolving reference voltage vector if the reference voltage magnitude is in a range of 0.3 to 0.6 and the angle of the revolving reference voltage vector is within a range of 30° to 60°; and identifying the sixth quasi-optimal zone as the one of the plurality of quasi-optimal zones that corresponds to both the reference voltage magnitude and the angle of the revolving reference voltage vector if the reference voltage magnitude is greater than 0.6 and the angle of the revolving reference voltage vector is within a range of 30° to 60°.

6. The method of claim 5 wherein applying the corresponding optimal SVM switching sequence for the one of the plurality of quasi-optimal zones to the modular three-phase converter comprises:

applying the corresponding optimal SVM switching sequence for the one of the plurality of quasi-optimal zones to a first VSC of the three interleaved, parallel connected VSCs;

applying the corresponding optimal SVM switching sequence for the one of the plurality of quasi-optimal zones to a second VSC of the three interleaved, parallel connected VSCs with a phase-shift of 120'; and applying the corresponding optimal SVM switching sequence for the one of the plurality of quasi-optimal zones to a third VSC of the three interleaved, parallel connected VSCs with a phase-shift of 240°.

7. The method of claim 1 wherein outputs of the three interleaved, parallel connected VSCs are coupled via a plurality of inductors, further wherein there is coupling between the inductors in the plurality of inductors.

8. The method of claim 1 wherein each of the plurality of quasi-optimal zones further comprises a corresponding optimal phase shift, and the method further comprises:

applying the corresponding optimal phase shift for the one of the plurality of quasi-optimal zones to the modular three-phase converter.

9. A system comprising:
a modular three-phase converter that comprises three interleaved, parallel connected Voltage Source Converters (VSCs); and
a Space Vector Pulse Width Modulation (SVM) controller associated with the modular three-phase converter adapted to:
obtain a sample of a revolving reference voltage vector that defines a reference voltage magnitude and angle of the revolving reference voltage vector;
identify one of a plurality of quasi-optimal zones in a space vector plane that corresponds to both the reference voltage magnitude and the angle of the revolving reference voltage vector, wherein the plurality of quasi-optimal zones comprises a first quasi-optimal zone defined for $0°<\alpha<30°$ and $0<V_{REF}<0.3$ having a first corresponding optimal SVM switching sequence, a second quasi-optimal zone defined for $0°<\alpha<30°$ and $0.3<V_{REF}<0.6$ having a second corresponding optimal SVM switching sequence, a third quasi-optimal zone defined for $0°<\alpha<30°$ and $V_{REF}>0.6$ having a third corresponding optimal SVM switching sequence, a fourth quasi-optimal zone defined for $30°<\alpha<60°$ and $0<V_{REF}<0.3$ having a fourth corresponding optimal SVM switching sequence, a fifth quasi-optimal zone defined for $30°<\alpha<60°$ and $0.3<V_{REF}<0.6$ having a fifth corresponding optimal SVM switching sequence, and a sixth quasi-optimal zone defined for $30°<\alpha<60°$ and $V_{REF}>0.6$ having a sixth corresponding optimal SVM switching sequence, where $V_{REF}$ is the reference voltage magnitude and $\alpha$ is the angle of the revolving reference voltage vector; and
apply the corresponding optimal SVM switching sequence for the one of the plurality of quasi-optimal zones to the modular three-phase converter.

10. The system of claim 9 wherein outputs of the three interleaved, parallel connected VSCs are coupled via a plurality of inductors, further wherein there is coupling between the inductors in the plurality of inductors.

11. The system of claim 9 wherein the plurality of quasi-optimal zones and the corresponding optimal SVM switching sequences for the plurality of quasi-optimal zones are both optimized to provide a desired characteristic for the modular three-phase converter.

12. The system of claim 9 wherein the plurality of quasi-optimal zones and the corresponding optimal SVM switching sequences for the plurality of quasi-optimal zones are both optimized for low Total Harmonic Distortion (THD) in a total line current of the modular three-phase converter.

13. The system of claim 9 wherein in order to apply the corresponding optimal SVM switching sequence for the one of the plurality of quasi-optimal zones to the modular three-phase converter, the SVM controller is further configured to:

apply the corresponding optimal SVM switching sequence for the one of the plurality of quasi-optimal zones to a first VSC of the three interleaved, parallel connected VSCs;

apply the corresponding optimal SVM switching sequence for the one of the plurality of quasi-optimal zones to a second VSC of the three interleaved, parallel connected VSCs with a phase-shift of 120°; and apply the corresponding optimal SVM switching sequence for the one of the plurality of quasi-optimal zones to a third VSC of the three interleaved, parallel connected VSCs with a phase-shift of 240°.

14. The system of claim 9 wherein in order to identify the one of the plurality of quasi-optimal zones that corresponds to both the reference voltage magnitude and the angle of the revolving reference voltage vector, the SVM controller is further configured to:
- identify the first quasi-optimal zone as the one of the plurality of quasi-optimal zones that corresponds to both the reference voltage magnitude and the angle of the revolving reference voltage vector if the reference voltage magnitude is less than 0.3 and the angle of the revolving reference voltage vector is within a range of 0° to 30°;
- identify the second quasi-optimal zone as the one of the plurality of quasi-optimal zones that corresponds to both the reference voltage magnitude and the angle of the revolving reference voltage vector if the reference voltage magnitude is in a range of 0.3 to 0.6 and the angle of the revolving reference voltage vector is within a range of 0° to 30°;
- identify the third quasi-optimal zone as the one of the plurality of quasi-optimal zones that corresponds to both the reference voltage magnitude and the angle of the revolving reference voltage vector if the reference voltage magnitude is greater than 0.6 and the angle of the revolving reference voltage vector is within a range of 0° to 30°;
- identify the fourth quasi-optimal zone as the one of the plurality of quasi-optimal zones that corresponds to both the reference voltage magnitude and the angle of the revolving reference voltage vector if the reference voltage magnitude is less than 0.3 and the angle of the revolving reference voltage vector is within a range of 30° to 60°;
- identify the fifth quasi-optimal zone as the one of the plurality of quasi-optimal zones that corresponds to both the reference voltage magnitude and the angle of the revolving reference voltage vector if the reference voltage magnitude is in a range of 0.3 to 0.6 and the angle of the revolving reference voltage vector is within a range of 30° to 60°; and
- identify the sixth quasi-optimal zone as the one of the plurality of quasi-optimal zones that corresponds to both the reference voltage magnitude and the angle of the revolving reference voltage vector if the reference voltage magnitude is greater than 0.6 and the angle of the revolving reference voltage vector is within a range of 30° to 60°.

15. The system of claim 14 wherein in order to apply the corresponding optimal SVM switching sequence for the one of the plurality of quasi-optimal zones to the modular three-phase converter, the SVM controller is further configured to:
- apply the corresponding optimal SVM switching sequence for the one of the plurality of quasi-optimal zones to a first VSC of the three interleaved, parallel connected VSCs;
- apply the corresponding optimal SVM switching sequence for the one of the plurality of quasi-optimal zones to a second VSC of the three interleaved, parallel connected VSCs with a phase-shift of 120°; and
- apply the corresponding optimal SVM switching sequence for the one of the plurality of quasi-optimal zones to a third VSC of the three interleaved, parallel connected VSCs with a phase-shift of 240°.

16. The system of claim 9 wherein each of the plurality of quasi-optimal zones further comprises a corresponding optimal phase shift, and the SVM controller is further configured to:
- apply the corresponding optimal phase shift for the one of the plurality of quasi-optimal zones to the modular three-phase converter.

\* \* \* \* \*